US011987934B2

(12) United States Patent
Curley et al.

(10) Patent No.: US 11,987,934 B2
(45) Date of Patent: May 21, 2024

(54) EMBOSSED MULTI-PLY TISSUE PRODUCT

(71) Applicant: Kimberly-Clark Worldwide, Inc., Neenah, WI (US)

(72) Inventors: Devon Gaynelle Curley, Menasha, WI (US); Elizabeth Oriel Bradley, Neenah, WI (US); Tammy Lynn Baum, Neenah, WI (US)

( * ) Notice: Subject to any disclaimer, the term of this patent is extended or adjusted under 35 U.S.C. 154(b) by 119 days.

(21) Appl. No.: 17/435,972

(22) PCT Filed: Mar. 6, 2019

(86) PCT No.: PCT/US2019/020950
§ 371 (c)(1),
(2) Date: Sep. 2, 2021

(87) PCT Pub. No.: WO2020/180314
PCT Pub. Date: Sep. 10, 2020

(65) Prior Publication Data

US 2022/0145544 A1 May 12, 2022

(51) Int. Cl.
*D21H 27/40* (2006.01)
*B31F 1/07* (2006.01)
(Continued)

(52) U.S. Cl.
CPC ............... *D21H 27/40* (2013.01); *B31F 1/07* (2013.01); *D21H 27/002* (2013.01);
(Continued)

(58) Field of Classification Search
CPC ...... D21H 27/40; D21H 27/02; D21H 27/002; D21H 27/007; B31F 1/07;
(Continued)

(56) References Cited

U.S. PATENT DOCUMENTS

| | | | |
|---|---|---|---|
| 4,469,735 A | 9/1984 | Trokhan | |
| 5,846,636 A | 12/1998 | Ruppel et al. | |

(Continued)

FOREIGN PATENT DOCUMENTS

| | | | | |
|---|---|---|---|---|
| CA | 2762220 A1 * | 11/2010 | ............. A47K 10/16 | |
| CA | 3080604 C * | 5/2023 | ........... D21H 27/002 | |

(Continued)

OTHER PUBLICATIONS

De Assis, Tiago et al., “Performance and Sustainability vs. the Shelf Price of Tissue Paper Kitchen Towels”, Research Gate, https://www.researchgate.net/publication/328465577_Performance_and_Sustainability_vs_the_Shelf_Price_of_Tissue_Paper_Kitchen_Towels.

(Continued)

*Primary Examiner* — Jose A Fortuna
(74) *Attorney, Agent, or Firm* — KIMBERLY-CLARK WORLDWIDE, INC.

(57) ABSTRACT

Embossed, multi-ply tissue products having consumer preferred physical properties and an aesthetically pleasing appearance such as a first tissue ply having a molded topographical pattern and a first embossed pattern comprising a plurality of embossed elements disposed thereon and a second tissue ply having a molded topographical pattern and a second embossed pattern comprising a plurality of dot emboss elements disposed thereon. The multi-ply tissue products generally have improved sheet bulk, such as a sheet bulk greater than about 15 cubic centimeters per gram (cc/g), and improved softness, such as an Average TS7 less than about 12.0 and more preferably less than about 11.0, such as from about 10.0 to about 12.0. The foregoing Average TS7 values may be obtained at a product geometric mean tensile strength (GMT) from about 800 to about 1,200 g/3".

16 Claims, 13 Drawing Sheets

(51) Int. Cl.
*D21H 27/00* (2006.01)
*D21H 27/02* (2006.01)

(52) U.S. Cl.
CPC ...... *D21H 27/02* (2013.01); *B31F 2201/0735* (2013.01); *B31F 2201/0761* (2013.01)

(58) Field of Classification Search
CPC ...... B31F 2201/0735; B31F 2201/0761; B31F 2201/0733
See application file for complete search history.

(56) References Cited

U.S. PATENT DOCUMENTS

| | | | | |
|---|---|---|---|---|
| 6,896,767 | B2 | 5/2005 | Wilhelm | |
| 7,118,796 | B2 | 10/2006 | Schulz et al. | |
| 7,291,379 | B2 | 11/2007 | Biagiotti | |
| 8,216,664 | B2 | 7/2012 | Graff | |
| 8,708,020 | B2 | 4/2014 | Schütz | |
| 9,915,034 | B2 | 3/2018 | Dwiggins | |
| 11,236,469 | B2 * | 2/2022 | LeCount | D21H 27/02 |
| 11,255,049 | B2 * | 2/2022 | LeCount | D21H 27/005 |
| 11,427,968 | B2 * | 8/2022 | Vogt | D21H 27/30 |
| 11,649,591 | B2 * | 5/2023 | Vogt | D21H 27/005 162/123 |
| 11,661,707 | B2 * | 5/2023 | Vogt | D21H 27/002 162/111 |
| 2002/0160155 | A1 | 10/2002 | Muller | |
| 2006/0108082 | A1 | 5/2006 | Bogdanski et al. | |
| 2008/0087395 | A1 | 4/2008 | Prodoehl et al. | |
| 2009/0218056 | A1 | 9/2009 | Manifold et al. | |
| 2009/0255640 | A1 | 10/2009 | Morin et al. | |
| 2009/0297781 | A1 | 12/2009 | Huss et al. | |
| 2010/0272965 | A1 | 10/2010 | Schinkoreit et al. | |
| 2010/0294444 | A1 | 11/2010 | Mellin et al. | |
| 2010/0294445 | A1 | 11/2010 | Mellin et al. | |
| 2011/0271852 | A1 | 11/2011 | Lin | |
| 2011/0311345 | A1 | 12/2011 | McNeil | |
| 2012/0156447 | A1 | 6/2012 | Hein et al. | |
| 2013/0029106 | A1 | 1/2013 | Lee et al. | |
| 2013/0344294 | A1 | 12/2013 | Eilert et al. | |
| 2014/0174686 | A1 | 6/2014 | Yang et al. | |
| 2018/0104928 | A1 | 4/2018 | Dwiggins | |
| 2018/0142422 | A1 | 5/2018 | Baum et al. | |
| 2018/0363244 | A1 | 12/2018 | Sierra et al. | |
| 2019/0024321 | A1 | 1/2019 | Schuh et al. | |
| 2020/0362518 | A1 * | 11/2020 | Swinicki | D21H 27/30 |
| 2021/0292972 | A1 * | 9/2021 | LeCount | B31F 1/07 |
| 2021/0310197 | A1 * | 10/2021 | LeCount | D21H 27/40 |
| 2021/0381172 | A1 * | 12/2021 | Goulet | D21H 27/40 |
| 2022/0024171 | A1 * | 1/2022 | Pleyber | D21H 27/02 |
| 2022/0127791 | A1 * | 4/2022 | LeCount | D21H 27/40 |
| 2022/0145544 | A1 * | 5/2022 | Curley | D21H 27/002 |
| 2022/0154409 | A1 * | 5/2022 | Curley | D21H 27/40 |
| 2022/0275584 | A1 | 9/2022 | Satake Neto et al. | |
| 2022/0282428 | A1 * | 9/2022 | Vogt | D21H 27/40 |
| 2023/0119448 | A1 * | 4/2023 | Kruchoski | D21H 27/004 162/109 |
| 2023/0148320 | A1 * | 5/2023 | Satori | D21H 27/02 162/111 |
| 2023/0220630 | A1 | 7/2023 | Mckee et al. | |
| 2023/0235513 | A1 * | 7/2023 | Vogt | D21H 27/002 162/123 |
| 2024/0060242 | A1 * | 2/2024 | LeCount | D21H 27/40 |

FOREIGN PATENT DOCUMENTS

| | | | | |
|---|---|---|---|---|
| CN | 101850636 | A | 10/2010 | |
| CN | 102028423 | A | 4/2011 | |
| CN | 103350527 | A | 10/2013 | |
| CN | 110359319 | A | 10/2019 | |
| EP | 1428654 | A1 | 6/2004 | |
| EP | 2692948 | A1 | 2/2014 | |
| JP | 2010148803 | A | 7/2010 | |
| WO | 1997044527 | A1 | 11/1997 | |
| WO | 2003082559 | A1 | 10/2003 | |
| WO | 2005080677 | A2 | 9/2005 | |
| WO | 2014155456 | A1 | 10/2014 | |
| WO | 2015095435 | A1 | 6/2015 | |
| WO | 2017066403 | A1 | 4/2017 | |
| WO | 2017196519 | A1 | 11/2017 | |
| WO | 2017197405 | A1 | 11/2017 | |
| WO | 2018081189 | A1 | 5/2018 | |
| WO | 2018081190 | A1 | 5/2018 | |
| WO | 2018081191 | A1 | 5/2018 | |
| WO | 2018217602 | A1 | 11/2018 | |
| WO | 2021177957 | A1 | 3/2020 | |
| WO | WO-2020091751 | A1 * | 5/2020 | B31F 1/07 |
| WO | WO-2021177957 | A1 * | 9/2021 | D21H 27/002 |
| WO | 2022125108 | A1 | 6/2022 | |

OTHER PUBLICATIONS

Co-pending U.S. Appl. No. 17/435,982, filed Sep. 9, 2021, by Curley et al. for "Embossed Multi-Ply Tissue Products".

* cited by examiner

EMBOSSED MULTI-PLY TISSUE PRODUCT

BACKGROUND

In the manufacture of paper products, particularly tissue products, it is generally desirable to provide an aesthetically pleasing final product with as much bulk as possible without compromising other product attributes, including softness, flexibility, absorbency, hand feel, and durability. However, most papermaking machines operating today utilize a process known as "wet-pressing". In "wet-pressing" a large amount of water is removed from the newly-formed web of paper by mechanically pressing water out of the web in a pressure nip. A disadvantage of the pressing step is that it densifies the web, thereby decreasing the bulk and absorbency of the sheet. One problem encountered in the past by first wet web pressing and/or then dry embossing is the difficulty in obtaining a tissue basesheet with good functionality, such as absorbency and softness, in combination with a pleasant appearance. This wet-pressing step, while an effective dewatering means, compresses the web and causes a marked reduction in web thickness, thus reducing bulk. In addition, using embossing to apply signature designs to a dry web generally results in a paper product that is gritty to hand feel, stiffer at the pattern edges, and with decreased absorbency.

Alternatives to wet-pressing such as through-air drying generally subject the web to less compression during manufacturing. For example, through-air drying typically involves forming a wet web from a papermaking furnish on a forming media, such as a forming fabric or wire. Then, the wet web is transferred to a permeable through-air-drying fabric around an open drum and non-compressively dried by passing hot air through the web while in intimate contact with the fabric. Through-air drying is a preferred method of drying a web because it avoids the compressive force of the dewatering step used in the conventional wet press method of tissue making. The resulting web optionally may be transferred to a Yankee dryer for creping. Such processes are typically referred to as creped through-air dried (CTAD). Because the web is substantially dry when transferred to the Yankee dryer, the process does not densify the sheet as much as the wet press process, however, embossing may still be needed to provide a tissue product having consumer preferred sheet bulk and designs. As with wet pressed webs, embossing has the drawback of a product that is gritty to hand feel, stiffer at the pattern edges, and with decreased absorbency.

An alternative to CTAD is the uncreped through-air dried (UCTAD) process described in U.S. Pat. Nos. 5,591,309 and 5,593,545. By eliminating the creping step the resulting web has relatively high bulk, good compressibility, and high resiliency, with the attendant benefits of increased absorbency and improved fiber utilization. While the web's improved bulk and resiliency may be desirable traits from a consumer perspective, they make the web difficult to emboss. Often patterns imparted by embossing an UCTAD web are poorly defined and fade over time as the resilient web relaxes.

Because it is poorly suited to embossing, tissue makers wishing to create UCTAD webs with design motifs have often resorted to using patterned through-air drying fabrics. For example, U.S. Pat. Nos. 6,749,719 and 7,624,765 disclose fabrics useful in the formation of tissue webs having design elements using the UCTAD process. While these fabrics may provide webs having design elements, they also impart the web with an overall textured background pattern. Thus, it may be difficult to discern the design elements. Further, the addition of design elements to the through-air drying fabrics reduces their air permeability, which in-turn reduces manufacturing efficiency.

Accordingly, there remains a need in the art for imparting molded through-air dried webs with an embossing design without negatively affecting the web's physical properties or the efficiency with which the webs are manufactured. There also remains a need for an embossing method, particularly a method for embossing high bulk, molded through-air dried tissue webs that provides both an aesthetically appealing multi-ply product and improved sheet bulk.

SUMMARY

It has now been discovered that embossed multi-ply through-air dried products can be improved by providing the two outer most plies with different embossing patterns, particularly a first embossing pattern comprising line emboss elements and a second embossing pattern comprising dot emboss elements. The resulting multi-ply tissue products have both a high degree of bulk and softness and also have a visually appealing aesthetic.

Hence in one embodiment, the present invention provides a method of making an embossed tissue product comprising the steps of: (a) depositing an aqueous suspension of papermaking fibers (furnish) onto an endless forming fabric to form a wet web; (b) at least partially dewatering the wet web; (c) transferring the partially dewatered web to a through-air drying fabric having a pattern thereon; (d) molding the web to the patterned through-air drying fabric to impart a first molded topographical pattern on the web; (e) through-air-drying the patterned web; (f) embossing the patterned web to impart a first embossed pattern on the web and provide a first embossed tissue ply; (g) embossing the patterned web to impart a second embossed pattern on the web and provide a second embossed tissue ply; and (h) plying the first and second embossed plies together to produce a multi-ply tissue product.

In certain embodiments the first molded topographical pattern, the first embossed pattern and the second embossed pattern are different, but visually related to one another. For example, the first molded topographical pattern may comprise a plurality of continuous, substantially machine direction (MD) oriented wave-like line elements, the second embossing pattern may comprise a plurality of substantially cross-machine direction oriented wave-like curvilinear elements consisting of embossed line elements, and the third embossing pattern may comprise a plurality of wave-like curvilinear elements consisting of dot emboss elements. Surprisingly, providing the second ply with wave-like curvilinear elements consisting of dot emboss elements, particularly a pattern having a pattern density from about 5 to about 15 embossments per square centimeter, provides the desired level of tensile degradation and also increases the bulk of the tissue product.

Accordingly, in another embodiment, the present invention provides an embossed multi-ply tissue product comprising a first tissue ply having a first side and an opposite second side, the first side having a molded topographical pattern and a first embossed pattern comprising a plurality of embossed elements disposed thereon; a second tissue ply having a first side and an opposite second side, the first side having a molded topographical pattern and a second embossed pattern comprising a plurality of dot emboss elements disposed thereon, wherein the embossed, multi-ply tissue product has a basis weight from about 20 to about 60 grams per square meter (gsm) and a bulk greater than about 15 cubic centimeters per gram (cc/g).

In still another embodiment, the present invention provides an embossed multi-ply tissue product comprising: a first surface having a molded topographical pattern consisting essentially of MD oriented line elements extending in a first principle direction and a first embossed pattern consisting essentially of a plurality of continuous, curvilinear line element embossments extending in a second principle direction disposed thereon, wherein from about 10 to about 30 percent of the first surface area is occupied by line element embossments; and a second surface having a molded topographical and a second embossed pattern consisting essentially of a plurality of dot emboss elements disposed thereon wherein from about 2 to about 12 percent, more preferably from about 5 to about 10 percent, of the second surface area is occupied by dot element embossments.

In yet another embodiment, the present invention provides an embossed multi-ply tissue product having a machine direction (MD) and a cross-machine direction (CD), the product comprising: a first embossed ply having an a first embossed pattern being characterized by the following features: consists essentially of open, curvilinear line elements oriented at an angle relative to the MD; is continuous; occupies from about 10 to about 30 percent of the surface area of the first ply; is substantially free from dot emboss elements; a second embossed ply having a second embossed pattern that is different than the first embossed pattern and which consists essentially of dot emboss elements; wherein the first and second embossing patterns are arranged such that when the first and second plies are brought into facing arrangement with one another only a portion of the second embossed pattern nests within the first embossed pattern.

In another embodiment, the present invention provides a method of manufacturing a high bulk embossed multi-ply tissue product comprising the steps of: (a) providing a first and a second tissue ply having a molded topographical pattern; (b) conveying the first tissue ply through a first embossing nip formed between a first backing roll and a first engraved embossing roll; (c) embossing a first embossed pattern onto the first ply, the first embossed pattern consisting essentially of line emboss elements; (d) conveying a second tissue ply through a second embossing nip formed between a second backing roll and a second engraved embossing roll; (e) embossing a second embossed pattern onto the second ply, the second embossed pattern consisting essentially of a plurality of dot emboss elements; and conveying the first and second tissue plies through a third nip formed between the first engraved embossing roll and a marrying roll to bring the first and second plies into facing arrangement with one another; wherein the first and second embossing patterns are arranged such that when the first and second plies are brought into facing arrangement with one another only a portion of the second embossed pattern nests within the first embossed pattern.

DEFINITIONS

Figure 1:
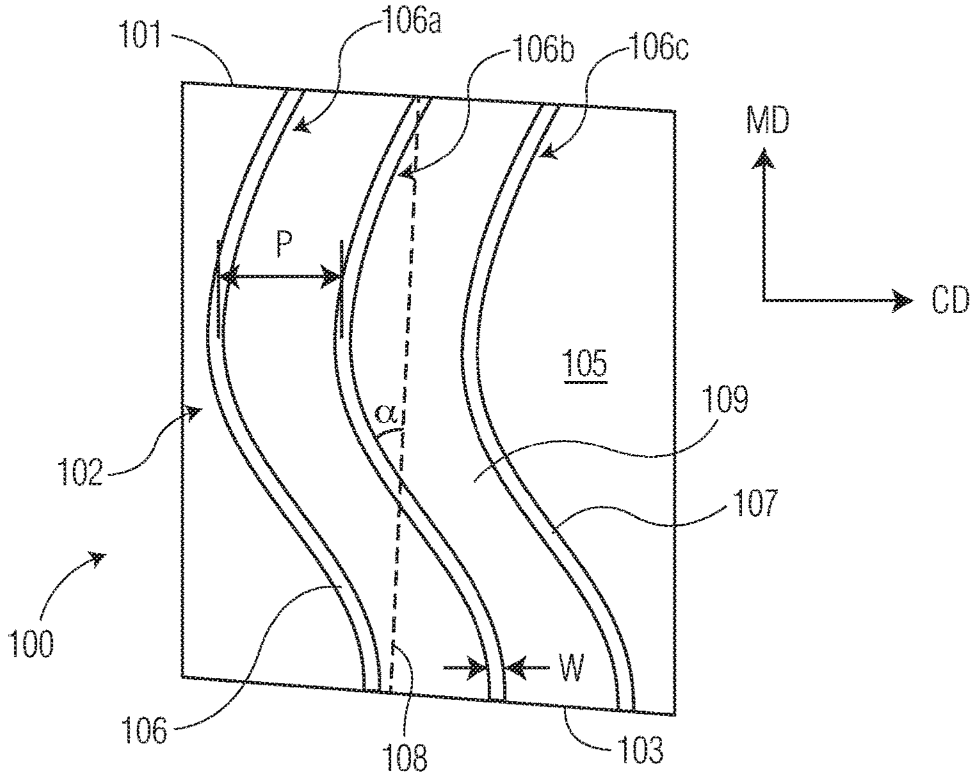
FIG. 1 is a top plan view of a molded tissue product useful in the present invention.

As used herein the term "Basesheet" refers to tissue web formed by any one of the papermaking processes described herein, but has not been subjected to further processing to convert the sheet into a finished product, such as embossing, calendering, perforating, plying, folding, or rolling into individual rolled products.

As used herein the term "Tissue Product" refers to products made from tissue webs and includes, bath tissues, facial tissues, paper towels, industrial wipers, foodservice wipers, napkins, medical pads, and other similar products. Tissue products may comprise one, two, three or more plies.

As used herein the term "Ply" refers to a discrete tissue web used to form a tissue product. Individual plies may be arranged in juxtaposition to each other.

As used therein, the term "Background Pattern" generally refers to a predominant overall pattern disposed on one surface of a tissue product, such as a molded topographical pattern or an embossed pattern.

As used herein, the term "Surface Plane" generally refers to the plane formed by the highest points of an object, such as the upper most surface of an engraved embossing roll, or the upper most surface of a tissue product. The surface plane may be determined by imaging a cross-section of the object, such as a tissue product, and drawing a line tangent to the highest point of its upper surface where the line is generally parallel to the x-axis of the object's surface and does not intersect any portion of the object.

As used herein the term "Pattern" generally refers to the arrangement of one or more design elements. Within a given pattern the design elements may be the same or may be different, further the design elements may be the same relative size or may be different sizes. For example, with reference to FIG. 3, the tissue product 150 comprises two patterns—a molded topographical pattern 155 comprising a plurality of elevated ridges 151 and valleys 153 therebetween, which form parallel, equally spaced apart sinusoidal wave elements, and an embossed pattern 160 comprising a plurality of curvilinear line embossed elements 162. In certain embodiments, a single design element may be repeated in a pattern, but the size of the design element may be different from one design element to the next within the pattern.

As used herein the term "Motif" generally refers to the recurrence of one or more design elements within a pattern. The recurrence of the design element may not necessarily occur within a given tissue product sheet, for example, in certain embodiments the design element may be a continuous design element extending across two adjacent sheets separated from one another by a line of perforations. Motifs are generally non-random repeating units that form a pattern.

As used herein the term "Linear Element" refers to an element in the shape of a line, which may be continuous, discrete, interrupted, or a partial line with respect to a tissue product on which it is present. The linear element may be of any suitable shape such as straight, curled, curvilinear, and mixtures thereof. In one example, the linear element may comprise a plurality of discrete elements, such as dots, dashes or broken lines for example, that are arranged relative to one another to form a linear element having a substantially connected visual appearance.

As used herein the term "Curvilinear Element" refers to any curved linear element having at least one inflection point. A curvilinear element need not be a line element, but rather may comprise discrete dots, dashes or line segments that are substantially connected visually. For example, with reference to FIG. 5, the embossing pattern 140 comprises a plurality of curvilinear elements 142*a*, 142*b* formed from a plurality of dot emboss elements 144*a*, 144*b*. Despite being formed from dot emboss elements 144*a*, 144*b* the curvilinear element 142*a* has a substantially connected visual appearance.

Curvilinear elements may be used to form one or more design elements according to the present invention. In certain embodiments a design element may be formed from a single curvilinear element or by a plurality of similarly shaped and spaced apart curvilinear elements.

As used herein the term "Continuous" when referring to an element disposed on the surface of a tissue product, such as a linear element, a design element or a pattern, means that the element extends throughout one dimension of the tissue product surface. One non-limiting example of a continuous pattern is illustrated in FIG. 1. The pattern 102 of FIG. 1 comprises a plurality of molded sinusoidal wave shaped line elements 106*a*-106*c* that extend from a first edge 101 to a second edge 103 of the product 100.

As used herein the term "Discrete" when referring to an element disposed on the surface of a tissue product, such as a line emboss element, a dot emboss element, a molded element, or a pattern, means that the element is visually unconnected from other elements. For example, FIG. 1 illustrates three discrete line elements 106*a*-106*c*.

As used herein, the term "Embossing Pattern" generally refers to arrangement of one or more design elements on the surface of a tissue product, resulting from the tissue product being conveyed through a nip comprising an engraved embossing roll. The design elements may be discrete, semi-continuous or continuous and may comprise a line emboss element, a dot emboss element, or combinations thereof. The embossing pattern generally comprises a portion of the tissue product lying below the upper most surface plane of the tissue product.

As used herein the term "Dot embossment" generally refers to an embossment having a ratio of embossment length, measured along the longest dimension of the embossment, to embossment width, measured along the shortest dimension of the embossment, of about 1:1. Non-limiting examples of dot embossments are embossments that are shaped like circles, squares, rectangles or diamonds. A plurality of spaced apart dot embossments that are substantially visually connected may form a linear element despite the embossments being spaced apart from one another.

A used herein the term "Line emboss element" generally refers to an embossment having a ratio of embossment length, measured along the longest dimension of the embossment, to embossment width, measured along the shortest dimension of the embossment, of greater than 1.

As used herein, the term "Embossment Plane" generally refers to the plane formed by the upper surface of the depressed portion of the tissue product forming the embossment. Generally the embossing element plane lies below the tissue product's surface plane. In certain embodiments the tissue product of the present invention may have a single embossing element plane, while in other embodiments the structure may have multiple embossing element planes. The embossing element plane is generally determined by imaging a cross-section of the tissue product and drawing a line tangent to the upper most surface of an embossment where the line is generally parallel to the x-axis of the tissue product.

As used herein the terms "Protuberance" and "Embossing Element" generally refer to any protuberance, boss, lug, finger, head, step, surface, or the like, having a z-directional height when measured from the axis of the roll, or some other common reference point. Generally the height is measured from the "base surface" of the roll, which is understood to be the peripheral surface of the roll having the least radial height when measured from the axis of the roll, or some other common reference point.

As used herein the term "Basis Weight" (BW) generally refers to the bone dry weight per unit area of a tissue and is generally expressed as grams per square meter (gsm). Basis weight is measured using TAPPI test method T-220. While basis weight may be varied, tissue products prepared according to the present invention generally have a basis weight greater than about 10 gsm, such as from about 10 to about 80 gsm and more preferably from about 30 to about 60 gsm.

As used herein, the term "Caliper" is the representative thickness of a single sheet (caliper of tissue products comprising two or more plies is the thickness of a single sheet of tissue product comprising all plies) measured in accordance with TAPPI test method T402 using a ProGage 500 Thickness Tester (Thwing-Albert Instrument Company, West Berlin, NJ). The micrometer has an anvil diameter of 2.22 inches (56.4 mm) and an anvil pressure of 132 grams per square inch (per 6.45 square centimeters) (2.0 kPa). The caliper of a tissue product may vary depending on a variety of manufacturing processes and the number of plies in the product, however, tissue products prepared according to the present invention generally have a caliper greater than about 600 μm, more preferably greater than about 700 μm and still more preferably greater than about 800 μm, such as from about 600 to about 900 μm.

As used herein the term "Sheet Bulk" refers to the quotient of the caliper (generally having units of μm) divided by the bone dry basis weight (generally having units of gsm). The resulting sheet bulk is expressed in cubic centimeters per gram (cc/g). While sheet bulk may vary depending on any one of a number of factors, tissue products prepared according to the present invention may have a sheet bulk greater than about 15.0 cc/g, such as from about 15.0 to about 20.0 cc/g, such as from about 16.0 to about 18.0 cc/g.

As used herein, the term "Geometric Mean Tensile" (GMT) refers to the square root of the product of the machine direction tensile strength and the cross-machine direction tensile strength of the tissue product. While the GMT may vary, tissue products prepared according to the present invention may have a GMT greater than about 700 g/3", such as from about 700 to about 1,400 g/3", such as from about 800 to about 1,200 g/3".

As used herein, the term "Stretch" generally refers to the ratio of the slack-corrected elongation of a specimen at the point it generates its peak load divided by the slack-corrected gauge length in any given orientation. Stretch is an output of the MTS TestWorks™ in the course of determining the tensile strength as described in the Test Methods section herein. Stretch is reported as a percentage and may be reported for machine direction stretch (MDS), cross-machine direction stretch (CDS) or as geometric mean stretch (GMS), which is the square root of the product of machine direction stretch and cross-machine direction stretch. While the stretch of tissue products prepared according to the present invention may vary, in certain embodiments tissue products prepared as disclosed herein have a GMS greater than about 8 percent, more preferably greater than about 10 percent and still more preferably greater than about 12 percent, such as from about 8 to about 14 percent, such as from about 10 to about 12 percent.

As used herein, the terms "T57" and "TS7 value" refer to the output of the EMTEC Tissue Softness Analyzer (commercially available from Emtec Electronic GmbH, Leipzig, Germany) as described in the Test Methods section. TS7 has units of dB V2 rms, however, TS7 may be referred to herein without reference to units. The TS7 value is the frequency peak that occurs around 6.5 kHz on the noise spectrum graph output from the EMTEC Tissue Softness Analyzer. This peak represents the softness of the sample. Generally, softer samples produce a lower TS7 peak.

As used herein, the term "Average TS7" generally refers to the TS7 value for a first and a second side of a tissue product. In certain embodiments the invention provides an embossed multi-ply tissue product, such as a through-air dried tissue product, having an Average TS7 less than about 12.0 and more preferably less than about 11.0, such as from about 10.0 to about 12.0. The foregoing Average TS7 values may be obtained at a product GMT from about 800 to about 1,200 g/3", such as from about 800 to about 1,000 g/3".

DETAILED DESCRIPTION

The present inventors have now discovered that tissue products, particularly multi-ply through-air dried tissue products having a three-dimensional surface topography, having improved softness and sheet bulk may be produced by embossing each of the plies. More particularly, the inventors have discovered that it may be useful to provide a tissue product having a first tissue ply having a molded topographical pattern and a first embossed pattern comprising a plurality of embossed elements disposed thereon, and a second tissue ply having a molded topographical pattern and a second embossed pattern comprising a plurality of dot emboss elements disposed thereon. The inventive multi-ply tissue products generally have improved sheet bulk, such as a sheet bulk greater than about 15 cubic centimeters per gram (cc/g), and improved softness, such as an Average TS7 less than about 12.0 and more preferably less than about 11.0, such as from about 10.0 to about 12.0. The foregoing Average TS7 values may be obtained at a product geometric mean tensile strength (GMT) from about 800 to about 1,200 g/3", such as from about 800 to about 1,000 g/3".

In certain preferred embodiments the improved tissue product properties may be achieved by embossing the first and second plies with different embossing patterns, such as embossing patterns having different element shapes, size, scale or density. The use of two different embossing patterns not only improves the properties of the tissue product, but may also be used to impart the product with two unique patterns that provides a distinctive look and is appealing to consumers.

Generally the first and second embossing patterns are combined with a tissue product having a molded pattern. The molded pattern, which may comprise a plurality of parallel, spaced apart linear elements, may form an overall background pattern over which the embossing pattern may be applied. For example, the tissue product may comprise a first and a second ply, where each ply comprises a molded background pattern consisting essentially of a plurality of parallel substantially machine direction (MD) oriented, continuous, wave-like ridges spaced apart from one another by valleys. The first ply may further comprise a first embossed pattern consisting essentially of line elements, such as continuous curvilinear elements. The second ply may comprise a second embossed pattern consisting essentially of a plurality of dot emboss elements, which in certain instances may be arranged to form a curvilinear element.

Thus, in certain preferred embodiments, the tissue products may be manufactured using a first and a second embossing roll having first and second embossing patterns that are different. For example, the first embossing pattern may comprise linear elements, which may be discrete or continuous, and the second embossing pattern may comprise non-linear elements. While in certain instances the first and second embossing patterns may be different, they may be related to one another. For example, the patterns may both comprise curvilinear elements that are visually related and provide the tissue product with an overall aesthetic that is desirable to a consumer.

In addition to at least partially forming the first and second embossing patterns from curvilinear elements, it may be advantageous to further relate the patterns by providing the elements with a similar scale. For example, the first embossing pattern may comprise a curvilinear line element having a first shape, such as a wave, with two points of inflection that define a segment length from about 30 to about 60 mm and the second embossing pattern may comprise a plurality of dot emboss elements arranged to form a curvilinear element also having a wave-like shape with two points of inflection and a segment length from about 30 to about 60 mm.

In still other instances the first and second embossing patterns may be further related to a molded topographical pattern disposed on the tissue ply. For example, the molded topographical pattern may comprise a plurality of parallel, spaced apart curvilinear elements, such as MD oriented sinusoidal waves, and both the first and second embossing patterns may also comprise curvilinear elements, such as sinusoidal waves.

The patterns may also be visually related to one another by forming the patterns with curvilinear elements having related weights or widths. For example, where the molded topographical pattern and the first embossing patterns are formed from curvilinear elements consisting of line elements the patterns may be related to one another by using similar line widths to form the curvilinear elements.

By providing patterns with similar shapes, scale, and line weights the patterns may appear complementary to one another and enhance the overall aesthetic of the tissue product, making it more visually appealing to consumers. Further, by relating the patterns in terms of shape, scale and line weight, the overall design connotations such as femininity, softness and cleansing are enhanced.

A wide breadth of design elements may be selected from when developing patterns useful in the present invention.

For example, in certain embodiments the patterns may consist essentially of curvilinear elements. In other embodiments the patterns may comprise a combination of curvilinear and rectilinear or straight elements. In still other embodiments the patterns may consist essentially of rectilinear or straight elements.

Several non-limiting examples of curvilinear elements are illustrated in the attached figures. For example, with reference to FIG. 1, the tissue product 100 having a machine direction (MD) and a cross-machine (CD) direction comprises a molded curvilinear pattern 102 disposed on its surface 105. The curvilinear pattern 102 comprises a plurality of continuous, wave-like and substantially MD oriented line elements 106*a*-106*c*. The wave-like topographical pattern repeatedly crosses the MD axis 108 to define an element angle (a), which in certain embodiments, may be about 20 degrees or less, such as from about 1 to about 20 degrees and more preferably from about 5 to about 15 degrees and still more preferably from about 8 to about 12 degrees.

With continued reference to FIG. 1, the line elements 106 are arranged generally parallel to one another such that no two line elements insect one another. In this manner the line elements are generally discrete. Further, each of the line elements 106 have a width (W), which in a preferred embodiment is substantially constant amongst and between line elements. Further, each of the line elements 106*a*-106*c* are spaced apart from one another a distance (P). Each line element 106 may be molded such that a portion of the element forms the upper most surface 105, also referred to herein as a molded peak 107. Generally the molded peak 107 lies above the ply surface 109 between adjacent peaks. In certain instances the inter-peak surface 109 may be referred to herein as a molded valley.

Figure 2:
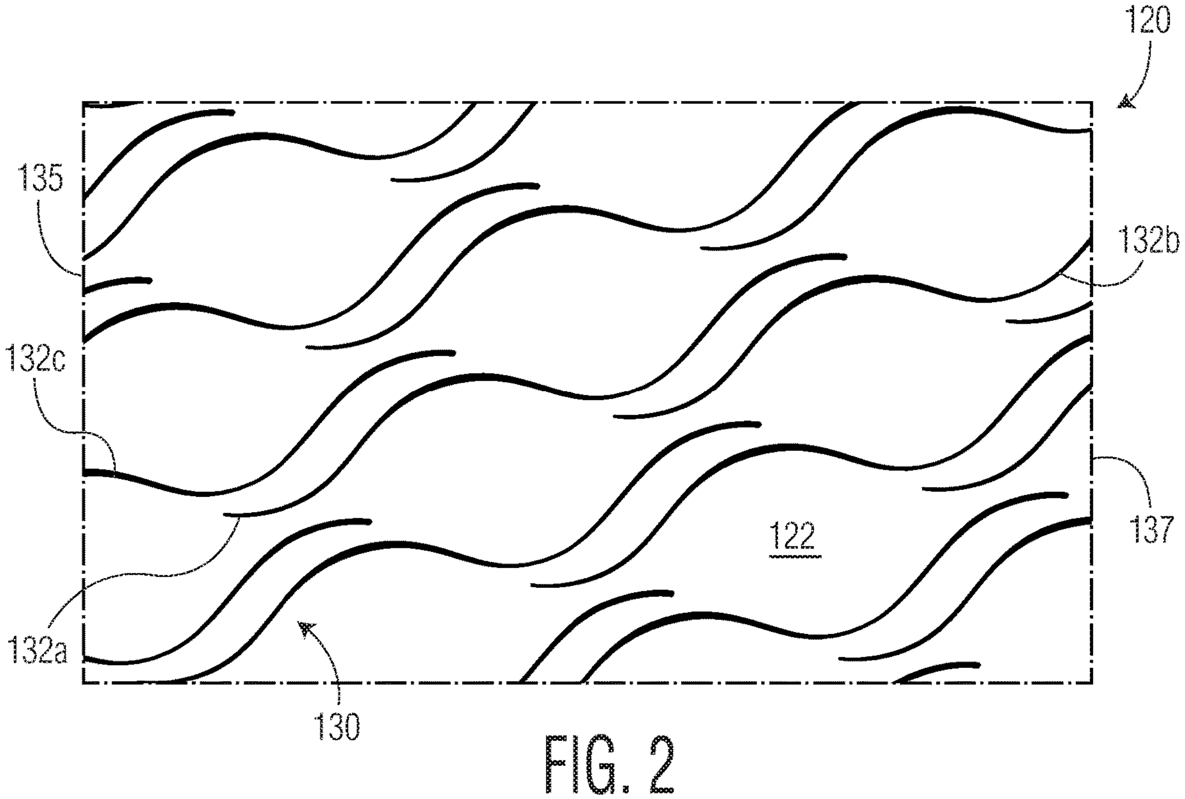
FIG. 2 is a top plan view of an embossing pattern useful in the present invention.

With reference now to FIG. 2, another embodiment of a curvilinear pattern 130 is illustrated. The pattern 130, which is illustrated as being engraved on an embossing roll 120 surface 122, comprises a plurality of discrete, curvilinear line elements 132*a*-132*c*. The curvilinear line elements 132*a*-132*c*, which are wave-like in shape, are arranged so as to be visually connected and form a continuous pattern 130 extending from a first edge 135 to a second edge 137 of the embossing roll 120.

Figure 3:
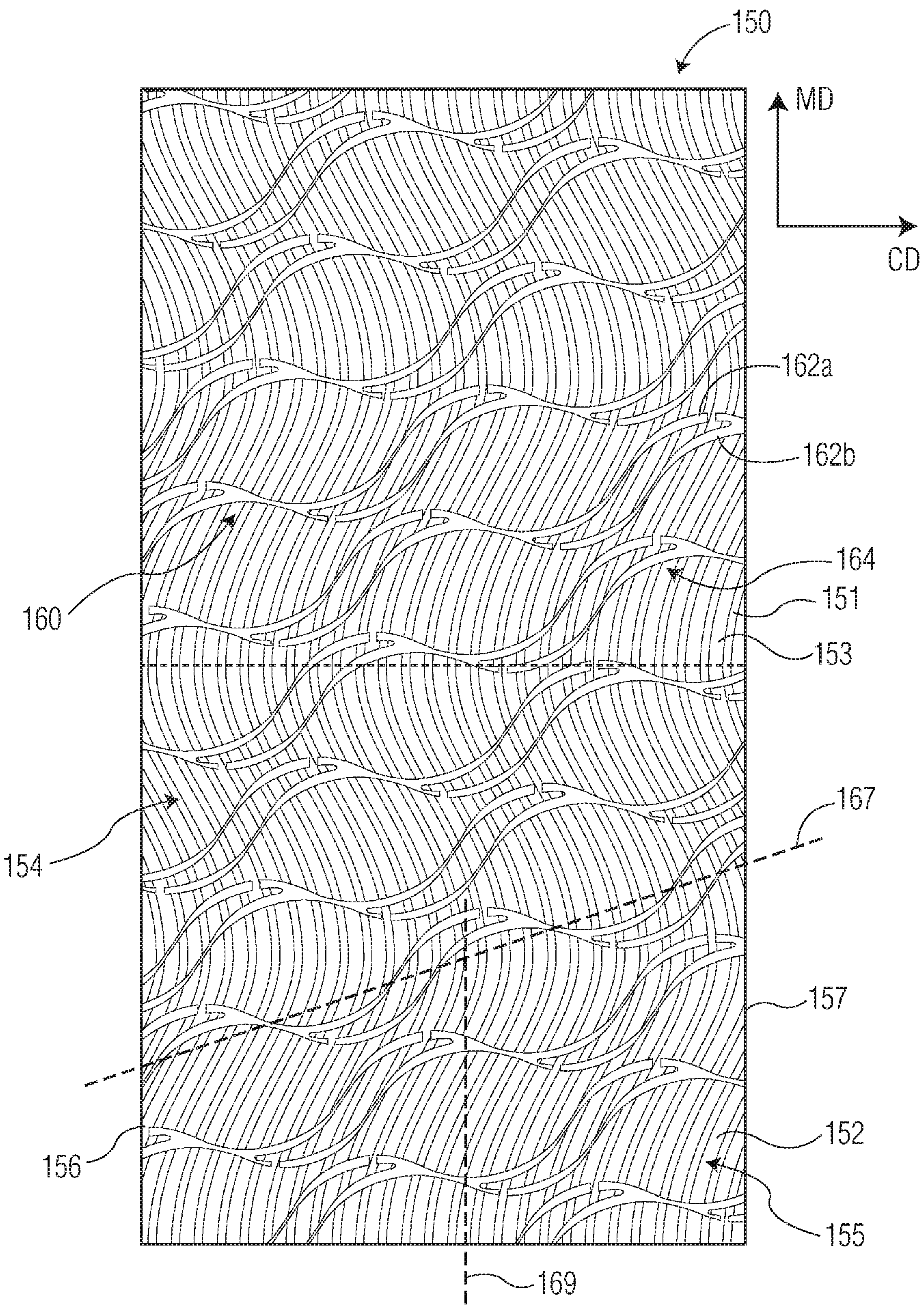
FIG. 3 is a top plan view of a tissue product according to one embodiment of the present invention.

Two or more patterns, such as a molded pattern and an embossed pattern may combined in a single tissue product, such as the product illustrated in FIG. 3. The illustrated tissue product 150 comprises a tissue ply 152 having an outer surface 154 and two principle dimensions—a machine direction (MD) and a cross-machine direction (CD). The product 150 includes a molded topographical pattern 155 defined by elevated ridges 151 and valleys 153 there-between. The product 150 further comprises a first embossed pattern 160 comprising motifs 164 having paired curvilinear line elements 162*a*, 162*b*. The curvilinear line elements 162*a*, 162*b* form a motif 164 that is repeated to form the first embossed pattern 160. The motifs 164 are disposed in a repeated fashion such that the resulting pattern 160 extends continuously across the outer surface 154 of the first ply 152 from a first product edge 156 to a second product edge 157. Further, the pattern 160 has a principle axis of orientation 167 extending generally in the cross-machine direction and oriented at an angle relative to the molded pattern axis of orientation 169, which may be oriented along the machine direction.

The embossed elements are generally formed by embossing a tissue ply using an embossing roll having a pattern corresponding to a first embossing pattern engraved thereon. As such, the embossed element is generally a depression having a bottom surface lying below the surface plane of the ply. The shape and depth of the embossment may be controlled by the shape and height of the protuberances on the engraved embossing roll which form the embossment. Further, according to the present invention the embossed elements generally overlay a background pattern, which is preferably formed by molding the ply prior to drying in the web manufacturing process. The molded topographical pattern generally has a three-dimensional shape, such as an upper most surface plane and a lower surface plane. In certain instances the upper most surface plane may correspond to molded peaks and the lower surface plane may corresponded to molded valleys.

With continued reference to FIG. 3 the product 150 further comprises a molded topographical pattern 155 defined by elevated ridges 151 and valleys 153 there-between. The molded topographical pattern 155 generally forms an overall background pattern and is overlaid by the first embossed pattern 160. The molded topographical pattern 155 is generally in the form of a continuous sinusoidal wave having an axis of orientation 169 that is substantially aligned with the machine direction. The ridges and valleys 151, 153 forming the molded pattern 155 are generally parallel to one another and uniformly spaced apart. While the illustrated pattern consists of equally spaced elements, the invention is not so limited. In certain alternate embodiments, the spacing may vary between pattern elements and in certain instances the spacing between two elements may vary as the element extends along one dimension of the product surface.

Figure 4:
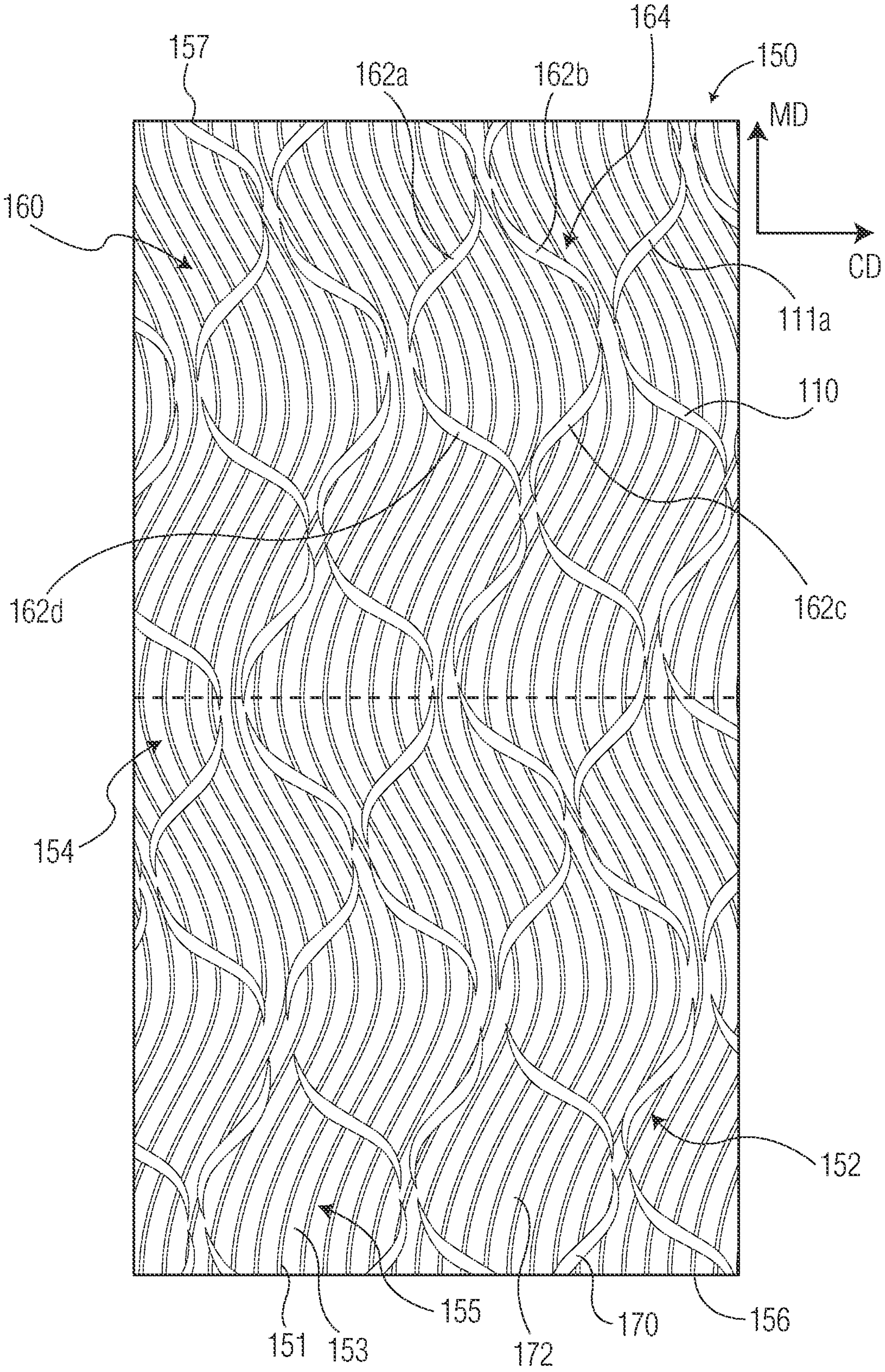
FIG. 4 is a top plan view of a tissue product according to another embodiment of the present invention.

With reference now to FIG. 4 yet another embodiment of a product 150 prepared according to the present invention is illustrated. The product 150 comprises a first outer ply 152 having an upper surface 154. The product 150 further comprises a molded topographical pattern 155 defined by elevated ridges 151 and valleys 153 there-between and a first embossed pattern 160. The first embossed pattern 160 comprises discrete curvilinear line embossed elements 162*a*-162*d* that form a motif 164 and repeat to form an embossing pattern 160. In the illustrated embodiment the embossed line elements 162*a*-162*d* are similarly sized in terms of width, length and depth, however the invention is not so limited. In certain embodiments the embossment depth is greater than about 0.5 mm, such as from about 0.5 to about 2.0 mm. The depth is generally measured as the distance between the bottom surface of the embossment and the upper most surface plane of the tissue product.

As further illustrated in FIG. 4 the outer surface 152 comprises both embossed 170 and unembossed 172 areas, also referred to herein as land areas. In the illustrated embodiment the land areas 172 are surrounded by embossed portions 170 comprising embossed line elements 162. The embossed line elements 162, which are discrete line elements, have the appearance of being continuous and together form a continuous embossed pattern 160 that extends from a first edge 156 to a second edge 157 of the tissue product 150. In certain embodiments the embossed area may be at least about 5 percent, and more preferably at least about 7.5 percent and still more preferably at least about 10 percent, such as from about 5 to about 30 percent and more preferably from about 10 to about 25 percent, of the first ply surface area. Further, the depth of the embossment may be at least about 0.5 mm, and more preferably at least about 0.75 mm, such as from about 0.5 to about 1.5 mm.

Figure 5:
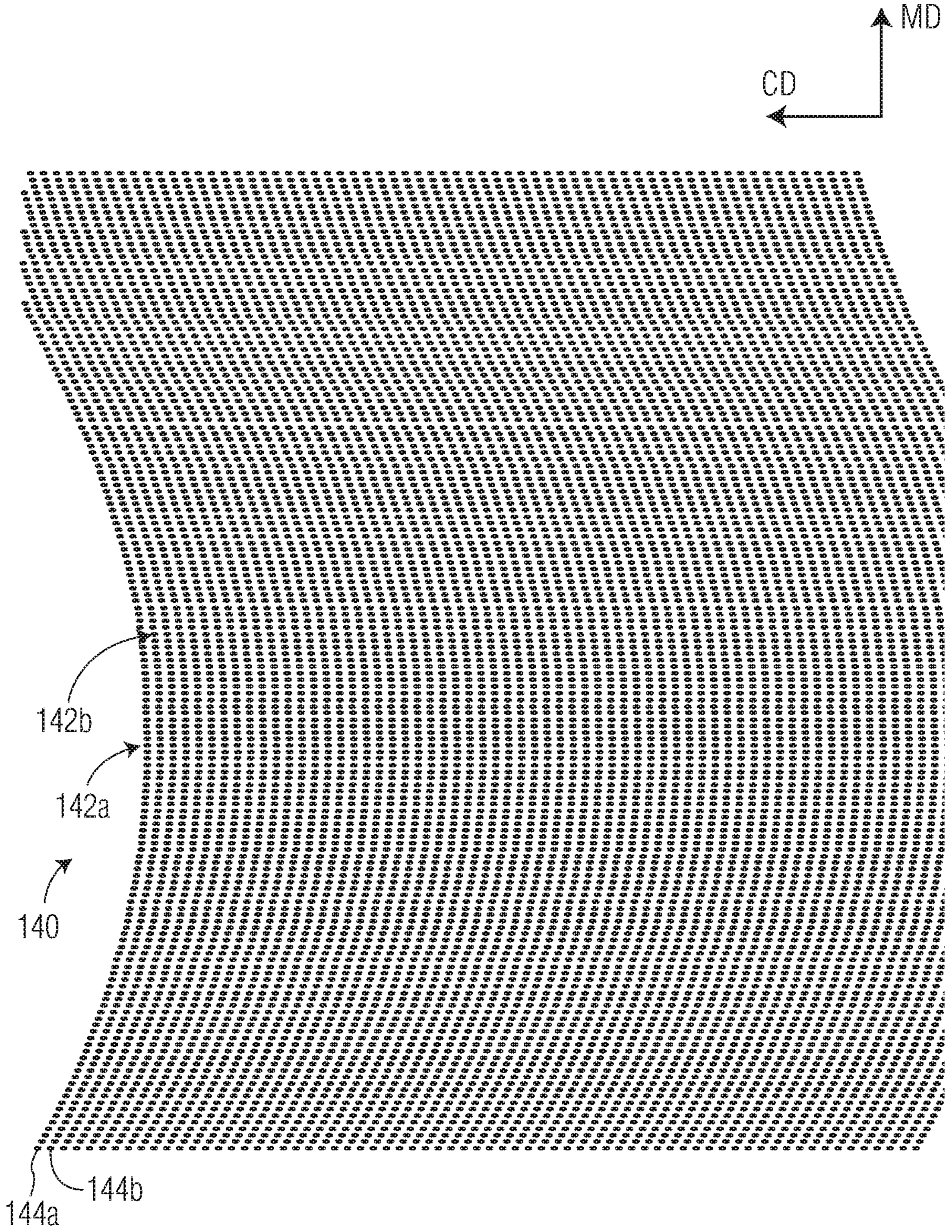
FIG. 5 is a top plan view of an embossing pattern useful in the present invention.

Referring now to FIG. 5, one embodiment of an embossing pattern 140 that may be incorporated into the second ply of a tissue product in accordance with the present invention is illustrated. As shown, the embossing pattern 140 comprises a plurality of dot emboss elements 144*a*, 144*b* that are arranged to form the pattern 140. In the illustrated embodiment, the dot emboss elements 144*a*, 144*b* are arranged to form spaced apart, continuous, curvilinear elements 142*a*, 142*b* having a wave-like shape that is substantially oriented in the machine direction (MD).

In those embodiments where one or more of the patterns consist of wave-like shape, such as a sinusoidal wave, the amplitude may range from about 10 to about 40 mm and still more preferably from about 18 to about 22 mm, and the wavelength may range from about 50 to about 200 mm and still more preferably from about 80 to about 120 mm. For example, in one particular embodiment, the second ply may comprise a molded background pattern and a dot emboss pattern where both patterns comprise a plurality of sinusoidal wave elements having an amplitude ranging from about 10 to about 40 mm and a wavelength ranging from 80 to about 120 mm. The amplitude and wavelength of the patterns may be the same for the molded and embossed patterns, or they may be different. Further, the molded and embossed patterns may be continuous or they may be discrete.

Figure 6:
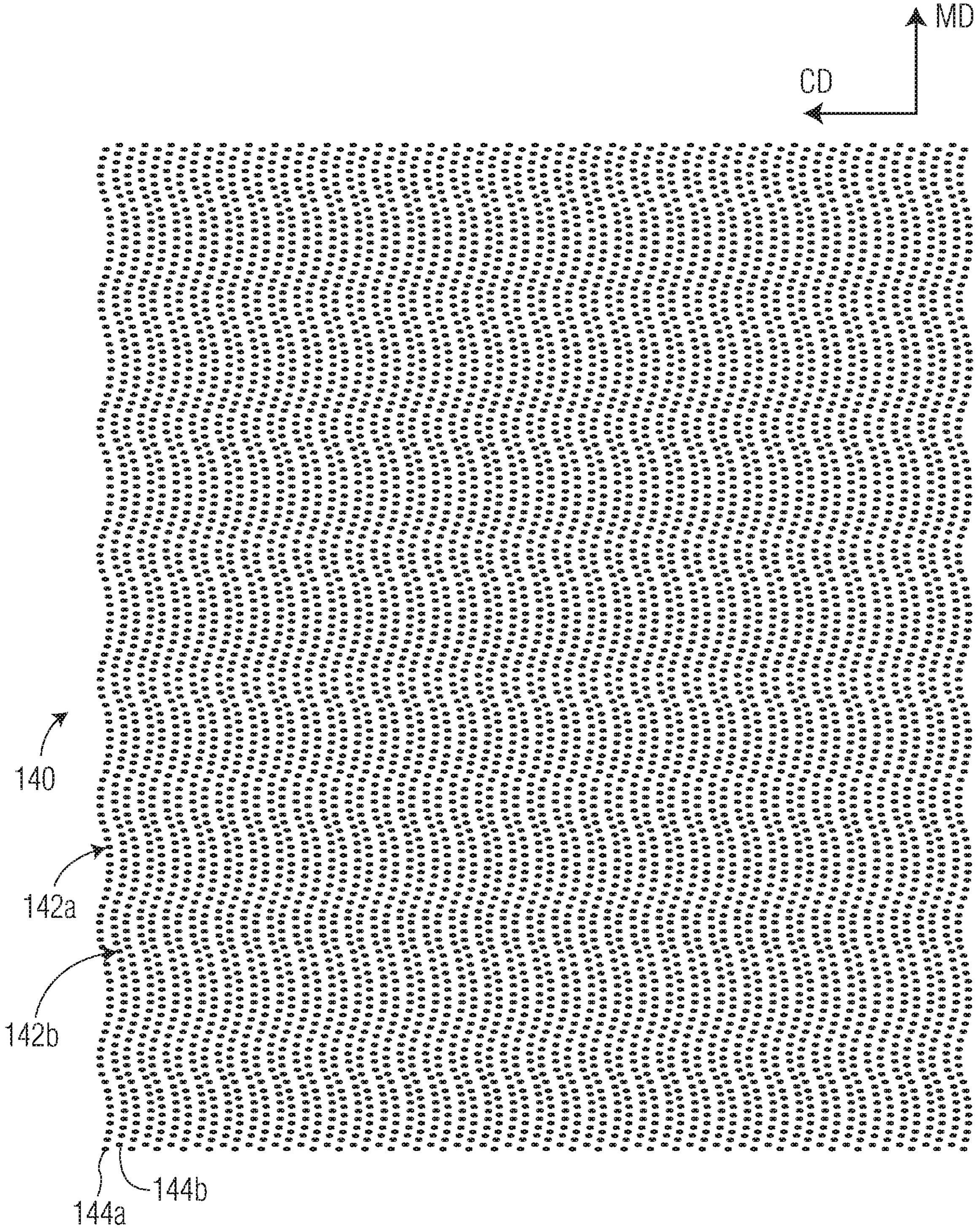
FIG. 6 is a top plan view of another embossing pattern useful in the present invention.

Another embodiment of a dot emboss pattern 140 is shown in FIG. 6. Like the pattern of FIG. 5, the dot emboss pattern of FIG. 6 is wave-like and comprises a plurality of dot emboss elements 144*a*, 144*b* arranged to form spaced apart, continuous, curvilinear elements 142*a*, 142*b*. The wave-like pattern 140 of FIG. 6, however, has a shorter period than the wave-like pattern of FIG. 10. Accordingly, in certain embodiments, the second ply may include a dot embossed pattern comprising a plurality of wave-like curvilinear elements having a wavelength from about 50 to about 200 mm, such as from about 80 to about 120 mm.

Figure 7:
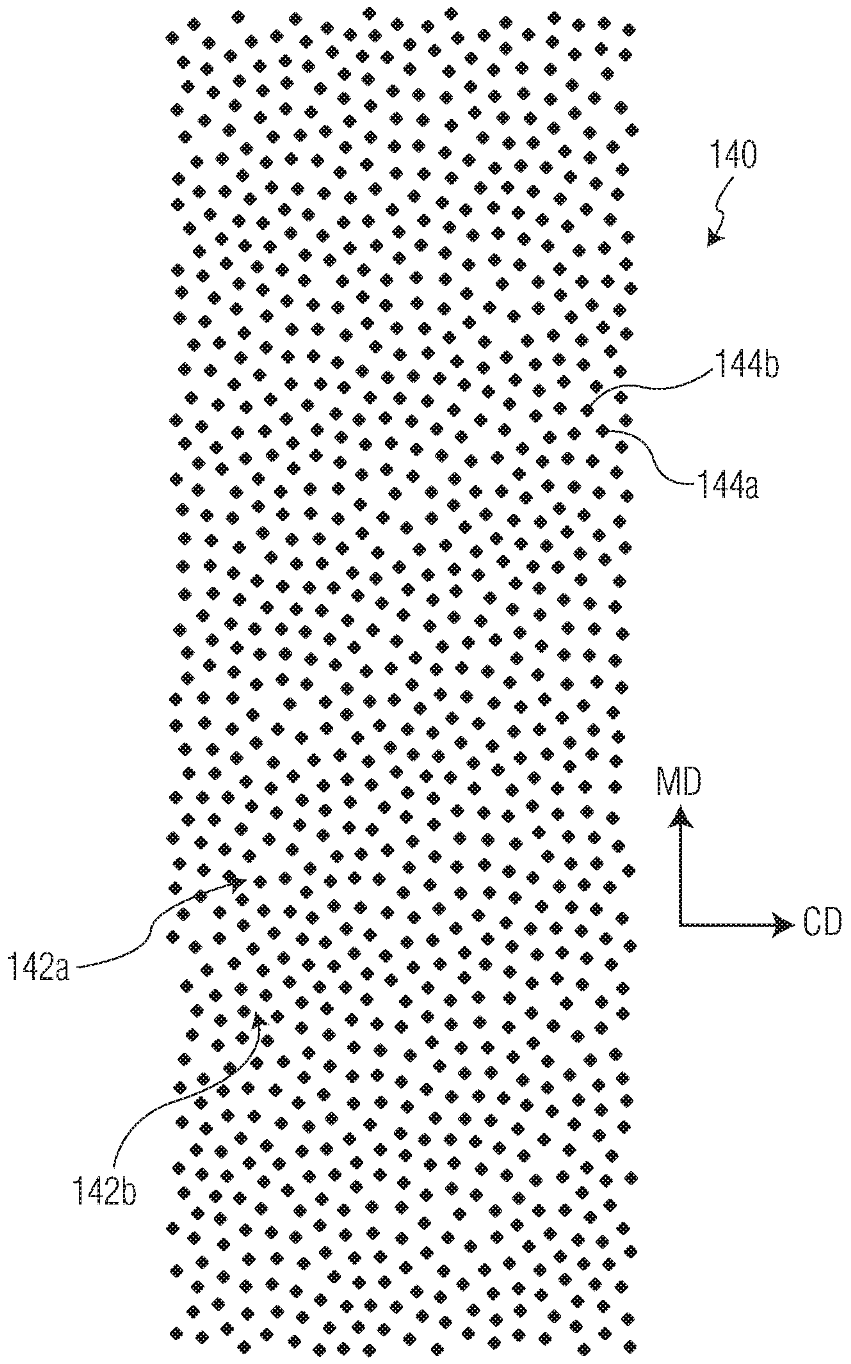
FIG. 7 is a top plan view of yet another embossing pattern useful in the present invention.

Still another embodiment of a dot emboss pattern 140 is shown in FIG. 7. The pattern 140 comprises a plurality of dot emboss elements 144*a*, 144*b* arranged to form spaced apart curvilinear elements 142*a*, 142*b*. The pattern may comprise from about 10 to about 15 dot emboss elements 144*a*, 144*b* per square centimeter and result in a tissue product having dot emboss elements covering from about 8 to about 12 percent of the surface area of the tissue product.

In addition to curvilinear design elements, particularly wave-like elements such as sine waves, other the dot emboss patterns disposed on the second ply may include other shapes such as zigzag or helix-like designs. In still other embodiments the dot emboss pattern may not be an overall pattern disposed substantially uniformly across the surface of the second tissue ply. Rather, the dot emboss pattern may include additional designs and patterns incorporated into the background pattern.

In the embodiment illustrated in FIGS. 5-7, the dot emboss elements are present at a density from about 10 to about 25 embossments per square centimeter. In other embodiments the density of dot emboss elements present on the second ply may range from about 5 to about 25 embossments per square centimeter, such as from about 7.5 to about 20, such as from about 10 to about 15 embossments per square centimeter. The spacing of dot emboss elements within a given linear element may be varied, as well as the spacing of linear elements relative to one another, to provide for the desired density. For example, in the embodiments illustrated in FIGS. 5 and 6, within each linear element the dot emboss elements are spaced about 0.16 cm from the center of one embossment to the center of an adjacent embossment. The distance between adjacent linear elements is about 0.24 cm from the center of one element to the center of an adjacent element. In this embodiment, the embossments themselves have a longest dimension of about 0.14 cm.

In certain embodiments both the spacing between dot emboss elements within a given linear element and dot embossments in adjacent elements may be substantially uniform for a given pattern. In other embodiments the spacing may be varied amongst intra-element dot emboss elements and inter-element dot emboss elements. Accordingly, in certain instances the dot emboss element density may be substantially uniform throughout a given pattern and in other instances the density may vary within a given pattern to have areas of high and lower density.

The various illustrated dot emboss patterns are merely a few examples of patterns that may be used in accordance with the present invention. In certain embodiments the dot embossments are disposed in a pattern such that at least about 2 percent, and more preferably at least about 5 percent, of the tissue surface area is covered by dot embossments. In other embodiments the percentage of the tissue surface area covered by dot embossments may range from about 2 to about 15 percent, such as from about 5 to about 10 percent.

In other instances the size of the pattern created by the dot embossments may be increased and decreased. For example, the density of dot emboss elements within a pattern may range from about 7.5 to about 20, particularly from about 7.5 to about 15 embossments per square centimeter and still achieve a soft and high bulk tissue product according to the present invention. Further, dot emboss elements themselves may take various shapes such as, for example, circles, ovals, diamonds, hexagons, triangles or any other suitable geometric formation. In particularly preferred embodiments the dot emboss elements are circular and have a diameter from about 0.075 to about 0.25 cm.

Figure 8:
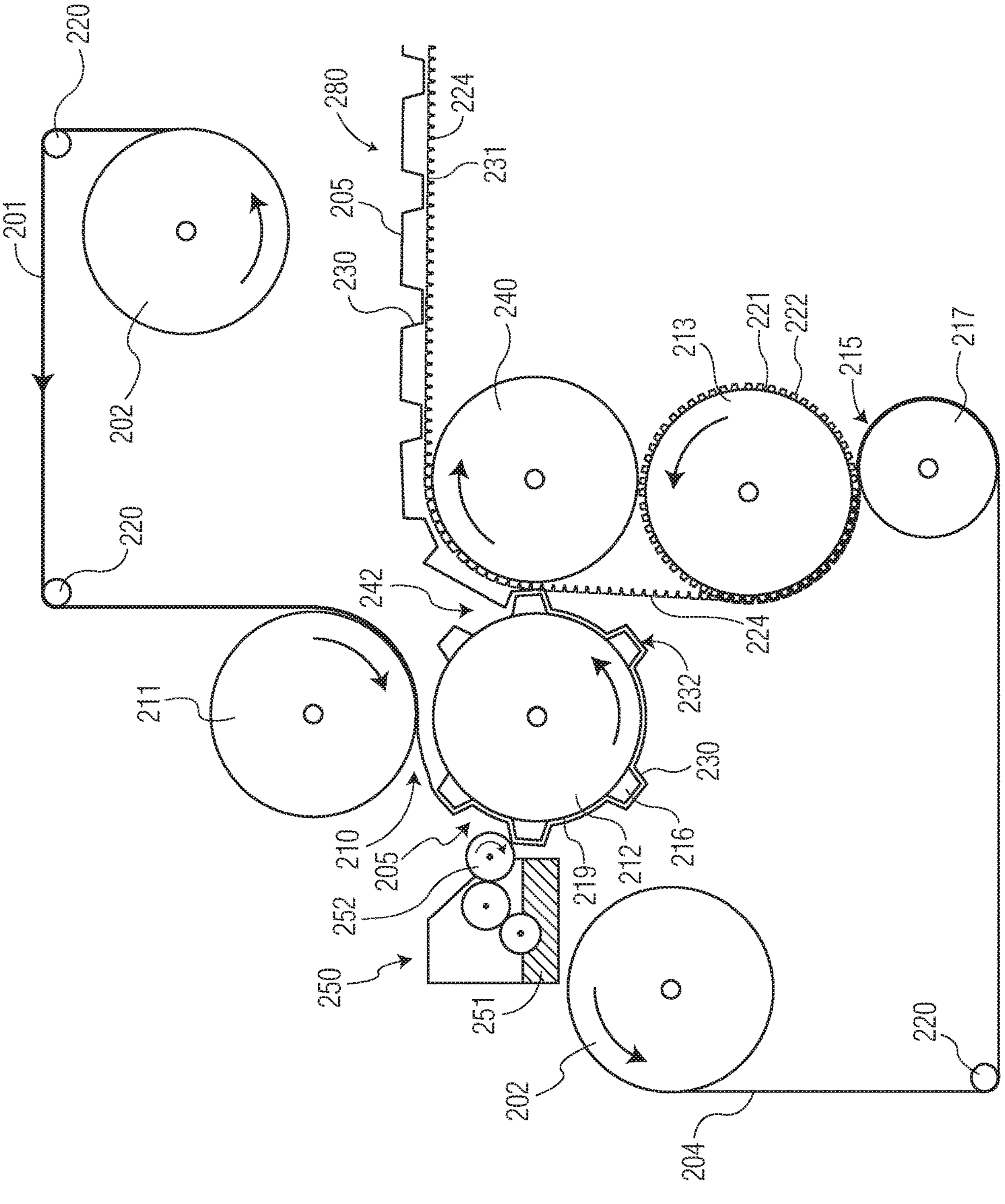
FIG. 8 is a schematic view of an embossing process useful in preparing tissue products according to one embodiment of the present invention.

The multi-ply tissue products of the present invention may be manufactured using the apparatus shown in FIG. 8. To produce a first embossed ply, a first tissue ply 201, which will form the uppermost ply of the finished tissue product, is unwound from a first parent roll 202 and conveyed past a series of idler rollers 220 towards a first embossing nip 210 located between a first engraved embossing roll 212 and a first impression roll 211. The engraved embossing roll 212 rotates in the counterclockwise direction while the impression roll 211 rotates in the clockwise direction.

The engraved embossing roll 212 is generally a hard and non-deformable roll, such as a steel roll, and comprises a plurality of protuberances 216, also referred to herein as embossing elements, extending radially from a first peripheral surface 219. The protuberances are arranged so as to form at least a first embossing pattern. One example of an embossing pattern formed on the outer surface of the first engraved embossing roll is shown in FIG. 2. The protuberances have a radial height generally measured from the first peripheral surface of the roll, which is understood to be the circumferential surface of the roll having the least radial height when measured from the axis of the roll, or some other common reference point. In certain embodiments the radial height of the protuberances may be about 1.30 mm or greater, such as from about 1.30 to about 1.50 mm and more preferably from about 1.35 to about 1.45 mm.

The protuberances of the first engraved roll may comprise a first pattern consisting of linear elements, and more preferably continuous line elements, where the linear elements are spaced apart from one another to form land areas there between. The land areas may be continuous or discontinuous within a given dimension of the engraved roll depending on the arrangement of linear elements forming the first pattern. The pattern may be continuous along at least one dimension of the engraved roll and even more preferably is a regular, repeating pattern disposed across at least one dimension of the engraved roll.

The spacing and arrangement of the elements forming the first pattern may vary depending on the desired tissue product properties and appearance. The shape of the element may also be varied to provide the desired tissue product properties and appearance. For example, in one embodiment, the linear elements forming the first pattern are curvilinear and more preferably sinusoidal and are arranged substantially parallel to one another such that none of the elements intersect one another. In other embodiments the linear elements may occur as wave-like patterns that are arranged in-phase with one another such that the spacing between adjacent elements is substantially constant. In other embodiments the linear elements may form a wave pattern where adjacent elements are offset from one another.

Regardless of the particular first element shape and the resulting motif and pattern, or whether adjacent elements within a pattern are in or out of phase with one another, it is generally preferred that there is some portion of the roll surface along which adjacent elements within a pattern are separated from one another. In this manner the roll comprises land areas between adjacent elements. In a particularly preferred embodiment the first pattern comprises a plurality of spaced apart linear elements where the pattern is disposed continuously across both the x and y dimensions of the engraved roll surface and adjacent linear elements are spaced apart from one another in the y-dimension at least about 1.0 cm, such as from about 1.0 to about 5.0 cm and more preferably from about 2.0 to about 4.0 cm.

With reference again to FIG. 8, the first engraved embossing roll 212 is urged against the first impression roll 211, which preferably has a substantially smooth deformable outer surface. In certain instances the impression roll may be a roll with a covering made of natural or synthetic rubber, for example, polybutadiene or copolymers of ethylene and propylene, or the like. In a particularly preferred embodiment the outer surface of the impression roll has a hardness greater than about 40 Shore (A), such as from about 40 to about 100 Shore (A) and more preferably from about 40 to about 80 Shore (A). By providing an impression roll with the foregoing hardness levels, the designs of the engraved embossing roll are not pressed into the impression roll as deep as in conventional apparatuses.

The first impression roll 211 and the first engraved embossing roll 212 are urged together to form a first embossing nip 210 through which the first tissue ply 201 passes to impose a first embossing pattern thereon. Generally a force or pressure is applied to one or both of the rolls such that the rolls are urged against one another causing the impression roll to deform about the protuberances such that when the ply is pressed about the protuberances and onto the landing areas (i.e. the outer surface areas of the roll surrounding the protuberances) an embossment results. As the embossed first tissue ply 205 exits the first embossing nip 210 it comprises a plurality of embossments 230 having distal ends 232.

To form a two-ply tissue product, a second parent roll 202 is unwound and the second tissue ply 204 is conveyed around an idler roller 220 and is then passed into a second embossing nip 215 formed between a second impression roll 217 and a second engraved embossing roll 213. The second impression roll generally has a smooth outer surface, which may be deformable. In certain instances the second impression roll has an outer covering comprising a natural or synthetic rubber and may have a hardness greater than about 40 Shore (A), such as from about 40 to about 100 Shore (A). The second engraved embossing roll 213 generally comprises a plurality of protuberances 222 extending from its peripheral surface 221. The protuberances are generally in the form of dot elements and form a second embossing pattern. In certain embodiments the protuberances disposed on the second engraved embossing roll may have a height of at least about 0.4 mm, such as from about 0.4 to about 2.0 mm.

As the second ply 204 passes through the second embossing nip 215 it is imparted with a plurality of dot emboss elements 231, which may be arranged to form a pattern. The embossed second ply 224 is then conveyed and brought into facing relation with the embossed first ply 205 using a marrying roll 240, as will be described in more detail below. While in certain instances the second engraved embossing roll 213 and impression roll 217 may be arranged relatively close to the first pair of rolls 211, 212 and the marrying roll 240, this is not necessary as the present method does not relying upon registration of the first and second embossing patterns with one another. In this manner, the present method differs from so called nested-method embossing, such as that described in U.S. Publ. No. 20120156447, where the embossing elements of the first embossing roll and the embossing elements of the second embossing roll are arranged such that the embossed elements of the first embossed ply and the embossed elements of the second embossed ply fit into each other similar to a gearing system.

After the embossed second ply 224 leaves the second embossing nip 215 it is brought into facing relationship with the embossed first ply 205. The two embossed plies 205, 224 are conveyed through a third nip 242 formed between the first engraved embossing roll 212 and a marrying roll 240, which may be a steel roll having a substantially smooth outer surface. The first and second embossed plies 205, 224 are joined together as they pass through the third nip 242 to form a multi-ply tissue product 280.

With continued reference to FIG. 8, in certain embodiments, after exiting the first embossing nip 210 the first embossed ply 205 encounters a gluing unit 250, which comprises an adhesive 251 disposed in a reservoir and an applicator roll 252. Adhesive 251 is transferred to the applicator roll 252 and applied to the distal ends 232 of the embossments 230 that are formed on the exterior surface of the embossed first tissue ply 205 by virtue of contact with the first protuberances 216. The embossed first tissue ply 205 with the applied adhesive 251 then advances further to the third nip 242 between the first engraved embossing roll 212 and the marrying roll 240. At this point, the embossed second ply 224 is attached to the embossed first ply 205 and then conveyed through the third nip 242 to form an adhesively laminated two-ply tissue product 280 which is subsequently wound into a roll (not shown).

The resulting two-ply tissue product 280 comprises embossed first and second plies 205, 224 with the first embossed ply 205 forming the upper most surface of the tissue product 280 and the second ply 224 forming the bottom most surface. In certain embodiments the first embossed ply may comprise a first embossed pattern consisting essentially of a plurality of continuous, curvilinear line element embossments and the second ply may comprise a plurality of dot emboss elements disposed thereon in a pattern consisting essentially of curvilinear elements. Further, although not illustrated in FIG. 8, each of the first and second tissue plies comprises a molded topographical pattern, which is generally imparted to the plies prior to embossing.

In certain embodiments, to improve processability and one or more physical properties, one or more of the fibrous plies may be subjected to preconditioning to impart moisture and/or heat to the tissue plies prior to entering an embossing nip. For example, preconditioning mechanisms may be positioned upstream of the nip located between the engraved roll and the impression role to introduce moisture and/or heat to the first tissue ply prior to embossing. Methods and arrangements for applying moisture and heat (e.g., steam) to tissue webs are known to skilled artisans, and can be employed and fall within the scope of the present invention. By way of example, steam can be applied to either or both sides of a web prior to embossing.

Tissue webs useful in forming the multi-ply tissue products of the present invention may be formed using any one of several well-known manufacturing processes. For example, in certain embodiments, tissue products may be produced by a through-air drying (TAD) manufacturing process, an advanced tissue molding system (ATMOS) manufacturing process, a structured tissue technology (STT) manufacturing process, or belt creped. In particularly preferred embodiments the tissue product is manufactured by a creped through-air dried (CTAD) process or uncreped through-air dried (UCTAD) process.

Tissue webs produced by the foregoing processes may be imparted with a first pattern by wet molding. For example, one or more design elements may be formed by wet molding the web during manufacture using a patterned papermaking fabric, such as a patterned through-air drying fabric which imparts the pattern on the tissue web as it is dried. The dried web, which retains the molded pattern, may then be subjected to converting, such as embossing, to impart a second pattern on the web.

In one embodiment, tissue webs useful in the present invention are formed by the UCTAD process of: (a) depositing an aqueous suspension of papermaking fibers (furnish) onto an endless forming fabric to form a wet web; (b) at least partially dewatering the wet web; (c) transferring the partially dewatered web to a through-air drying fabric having a pattern thereon; (d) molding the web to the patterned through-air drying fabric to impart a first pattern on the web; (e) through-air-drying the web; and (f) embossing the web to impart a second pattern on the web.

Multi-ply tissue products produced according to the present invention not only have first and second patterns that may be aesthetically pleasing to a consumer, they may also have favorable physical properties, such as sufficient strength to withstand use while also being soft and having good hand-feel. Accordingly, in one embodiment the present invention provides an embossed multi-ply tissue product comprising: a first tissue ply having a first side and an opposite second side, the first side having a molded topographical pattern and a first embossed pattern comprising a plurality of embossed elements disposed thereon; a second tissue ply having a first side and an opposite second side, the first side having a molded topographical pattern and a second embossed pattern comprising a plurality of dot emboss elements disposed thereon, wherein the tissue product has a basis weight from about 10 to about 100 gsm, and more preferably from about 15 to about 60 gsm and a sheet bulk greater than about 15.0 cc/g and more preferably greater than about 16.0 cc/g, and still more preferably greater than about 17.0 cc/g, such as from about 15.0 to about 20.0 cc/g.

In addition to having the foregoing basis weights and sheet bulks, multi-ply tissue products prepared according to the present invention may have a geometric mean tensile (GMT) greater than about 700 g/3", such as from about 700 to about 1,400 g/3", and more preferably from about 800 to about 1,200 g/3" and still more preferably from about 800 to about 1,000 g/3". At these tensile strengths the tissue webs and products have relatively low Average TS7 values, such as less than about 12.0 and more preferably less than about 11.0, such as from about 10.0 to about 12.0.

In one particularly preferred embodiment of the present invention an embossed multi-ply tissue product comprising: a first tissue ply having a first side and an opposite second side, the first side having a molded topographical pattern and a first embossed pattern comprising a plurality of embossed elements disposed thereon; a second tissue ply having a first side and an opposite second side, the first side having a molded topographical pattern and a second embossed pattern comprising a plurality of dot emboss elements disposed thereon, wherein the tissue product has a basis weight of about 45 gsm or greater, a GMT from about 700 to about 1,000 g/3", an Average TS7 less than about 12.0 and a sheet bulk greater than about 15.0 cc/g.

TEST METHODS

Sheet Bulk

Sheet Bulk is calculated as the quotient of the dry sheet caliper (μm) divided by the bone dry basis weight (gsm). Dry sheet caliper is the measurement of the thickness of a single sheet of tissue product (comprising all plies) measured in accordance with TAPPI test method 1402 using a ProGage 500 Thickness Tester (Thwing-Albert Instrument Company, West Berlin, NJ). The micrometer has an anvil diameter of 2.22 inches (56.4 mm) and an anvil pressure of 132 grams per square inch (per 6.45 square centimeters) (2.0 kPa).

Tensile

Tensile testing was done in accordance with TAPPI test method T-576 "Tensile properties of towel and tissue products (using constant rate of elongation)" wherein the testing is conducted on a tensile testing machine maintaining a constant rate of elongation and the width of each specimen tested is 3 inches. More specifically, samples for dry tensile strength testing were prepared by cutting a 3±0.05 inch (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was an MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on the direction of the sample being tested. The geometric mean tensile (GMT) strength was calculated and is expressed as grams-force per 3 inches of sample width. Tensile energy absorbed (TEA) and slope are also calculated by the tensile tester. TEA is reported in units of gm·cm/cm$^2$. Slope is recorded in units of kg. Both TEA and Slope are directionally dependent and thus MD and CD directions are measured independently. Geometric mean TEA and geometric mean slope are defined as the square root of the product of the representative MD and CD values for the given property.

The product tensile strength, and related tensile properties, were tested as multi-ply products and results represent the tensile strength of the total product. For example, a two-ply product was tested as a two-ply product and recorded as such. Five representative specimens were tested for each multi-ply product and the arithmetic average of all individual specimen tests was recorded as the appropriate tensile property of the sample.

The tensile strength, and related tensile properties, of individual plies of a multi-ply product were tested as individual single plies. Prior to testing each individual ply, care was taken to separate each ply of a multi-ply product to ensure that the ply was undamaged. Plies having any tears or defects were discarded. Five representative specimens were tested for each multi-ply product, with each ply being tested individually, and the arithmetic average of all individual specimen tests was recorded as the appropriate tensile property of the given ply.

Tissue Softness

Tissue softness was measured using an EMTEC Tissue Softness Analyzer ("TSA") (Emtec Electronic GmbH, Leipzig, Germany). The TSA comprises a rotor with vertical blades which rotate on the test piece applying a defined contact pressure. Contact between the vertical blades and the test piece creates vibrations, which are sensed by a vibration sensor. The sensor then transmits a signal to a PC for processing and display. The signal is displayed as a frequency spectrum. For measurement of TS7 values the blades are pressed against the sample with a load of 100 mN and the rotational speed of the blades is two revolutions per second.

The frequency analysis in the range of approximately 200 to 1000 Hz represents the surface smoothness or texture of the test piece. The peak in the frequency range between 200 to 1000 Hz is herein referred to as the TS750 value and is expressed as dB V$^2$ rms. A high amplitude peak correlates to a rougher surface.

A further peak in the frequency range between 6 and 7 kHz represents the softness of the test piece. The peak in the frequency range between 6 and 7 kHz is herein referred to as the TS7 value and is expressed as dB V$^2$ rms. The lower the amplitude of the peak occurring between 6 and 7 kHz, the softer the test piece.

In addition to TS750 and TS7, the analyzer reports a stiffness parameter (D) having units of mm/N. The stiffness parameter (D) is the deformation of the sample under a defined load.

Figure 14:
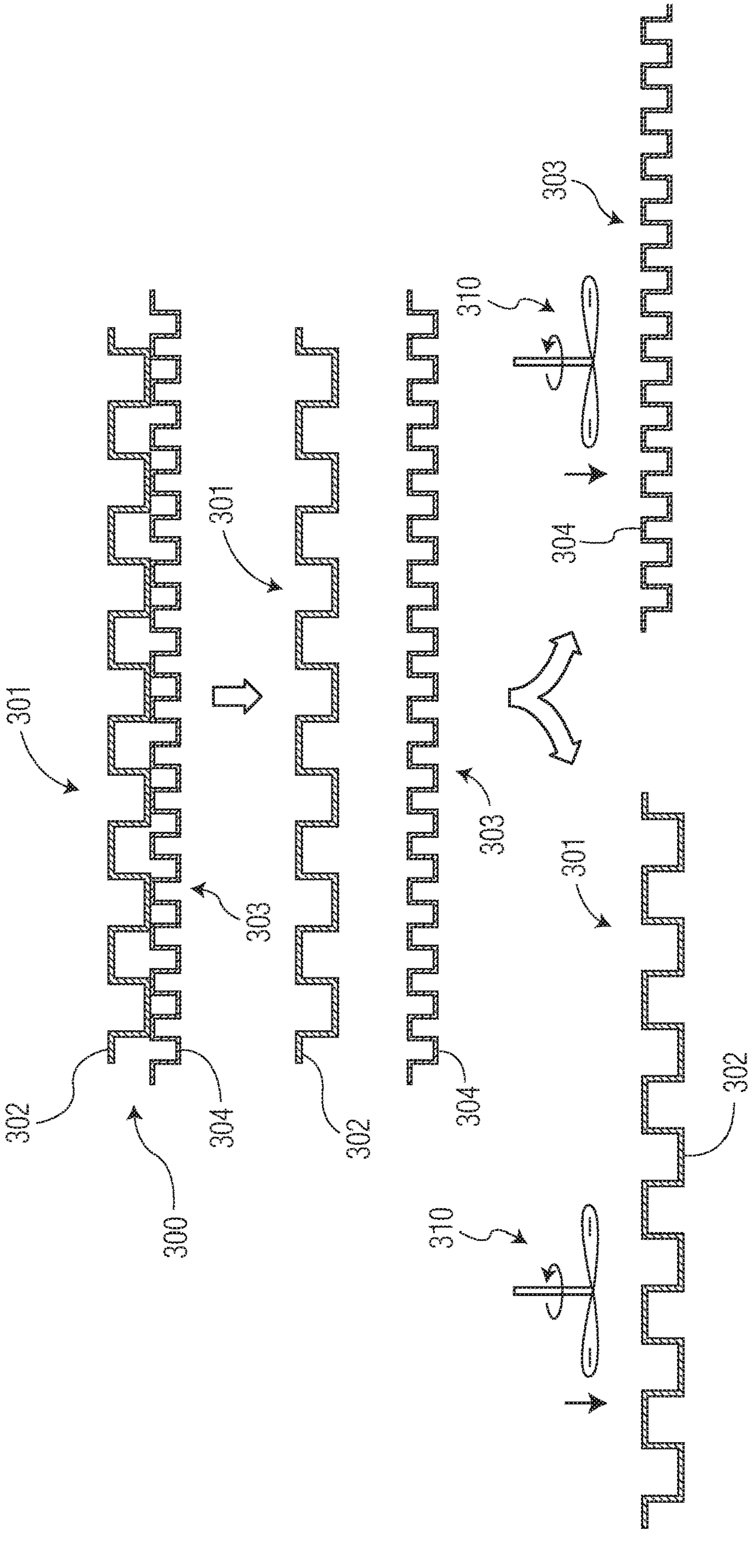
FIG. 14 illustrates preparation of a sample for testing using a tissue softness analyzer as described in the Test Methods section below.

Test samples were prepared by cutting a circular sample having a diameter of 112.8 mm. All samples were allowed to equilibrate at TAPPI standard temperature and humidity conditions for at least 24 hours prior to completing the TSA testing. The softness of the outer most surface of each ply is tested separately. As illustrated in FIG. 14, a multi-ply product 300 having first and second outer surfaces 301, 303 is separated into individual plies 302, 304, taking care not to damage the individual plies. Each ply 302, 304 is tested separately by placing an individual ply 302 or 304 in the TSA. The outer surface 301 or 303 of the ply 302 or 304 is faced upward in the TSA and is the surface contacted by the testing apparatus 310 during analysis.

The sample is secured and the measurements are started via the PC. The PC records, processes and stores all of the data according to standard TSA protocol. The reported values are the average of five replicates, each one with a new sample.

EXAMPLES

Basesheets were made using a through-air dried papermaking process commonly referred to as "uncreped through-air dried" ("UCTAD") and generally described in U.S. Pat. No. 5,607,551, the contents of which are incorporated herein in a manner consistent with the present disclosure. Basesheets with a target bone dry basis weight of about 26 grams per square meter (gsm) were produced. The base sheets were then converted by calendering, embossing, plying and winding to yield embossed two-ply tissue products.

In all cases the base sheets were produced from a furnish comprising northern softwood kraft and *eucalyptus* kraft using a layered headbox fed by three stock chests such that the webs having three layers (two outer layers and a middle layer) were formed. The two outer layers comprised *eucalyptus* kraft pulp (each layer comprising 30 percent weight by total weight of the web) and the middle layer comprised northern softwood kraft pulp (comprising 30 percent weight by total weight of the web). The center layer contained temporary wet strength, Fennobond 3000 (commercially available from Kemira, Atlanta, GA), which was added at 2 kg per metric ton of furnish. In certain instances the softwood furnish was refined to control strength.

The tissue web was formed on a Voith Fabrics TissueForm V forming fabric, vacuum dewatered to approximately 25 percent consistency and then subjected to rush transfer when transferred to the transfer fabric. The transfer fabric was the fabric described as "Fred" in U.S. Pat. No. 7,611,607 (commercially available from Voith Fabrics, Appleton, WI). The web was then transferred to a through-air drying fabric comprising a printed silicone pattern disposed on the sheet contacting side. The silicone formed a wave-like pattern on the sheet contacting side of the fabric. The pattern had a height of about 0.6 mm, a wavelength of about 100 mm and an amplitude of about 10 mm. The elements within the pattern were spaced apart from one another about 3.08 mm (center-to-center spacing). Transfer to the through-drying fabric was done using vacuum levels of greater than 10 inches of mercury at the transfer. The web was then dried to approximately 98 percent solids before winding.

The basesheet was calendered using two conventional polyurethane/steel calenders. The first calender comprised a 40 P&J polyurethane roll on the air side of the sheet and a standard steel roll on the fabric side at a load of 75 pli. The second calender comprised a 15 P&J polyurethane roll on the air side of the sheet and a standard steel roll on the fabric side at a load of 50 pli.

The calendered basesheet was then converted into two-ply rolled tissue products, substantially as illustrated in FIG. 1, by embossing the first and second plies separately and laminating the embossed plies to form a two-ply tissue product. The first ply was embossed using an embossing roll engraved with a pattern substantially similar to that illustrated in FIG. 2. The second ply was embossed using several different engraved rolls to assess their effect on the resulting tissue product properties. The properties of the engraved rolls used to emboss the second ply are summarized in Table 1, below.

TABLE 1

Figure 9:
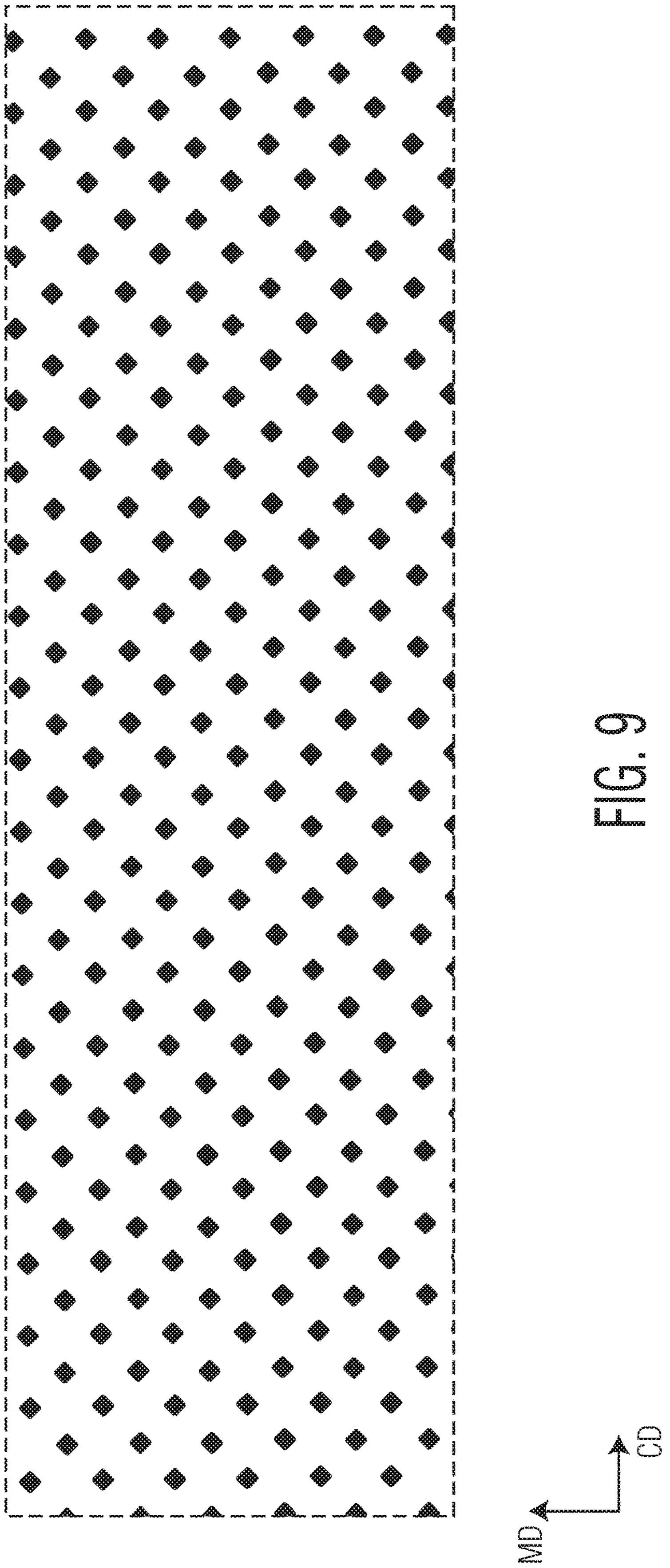
FIGS. 9-12 are top plan views of embossing patterns used to prepare various tissue product samples described herein.
Figure 10:
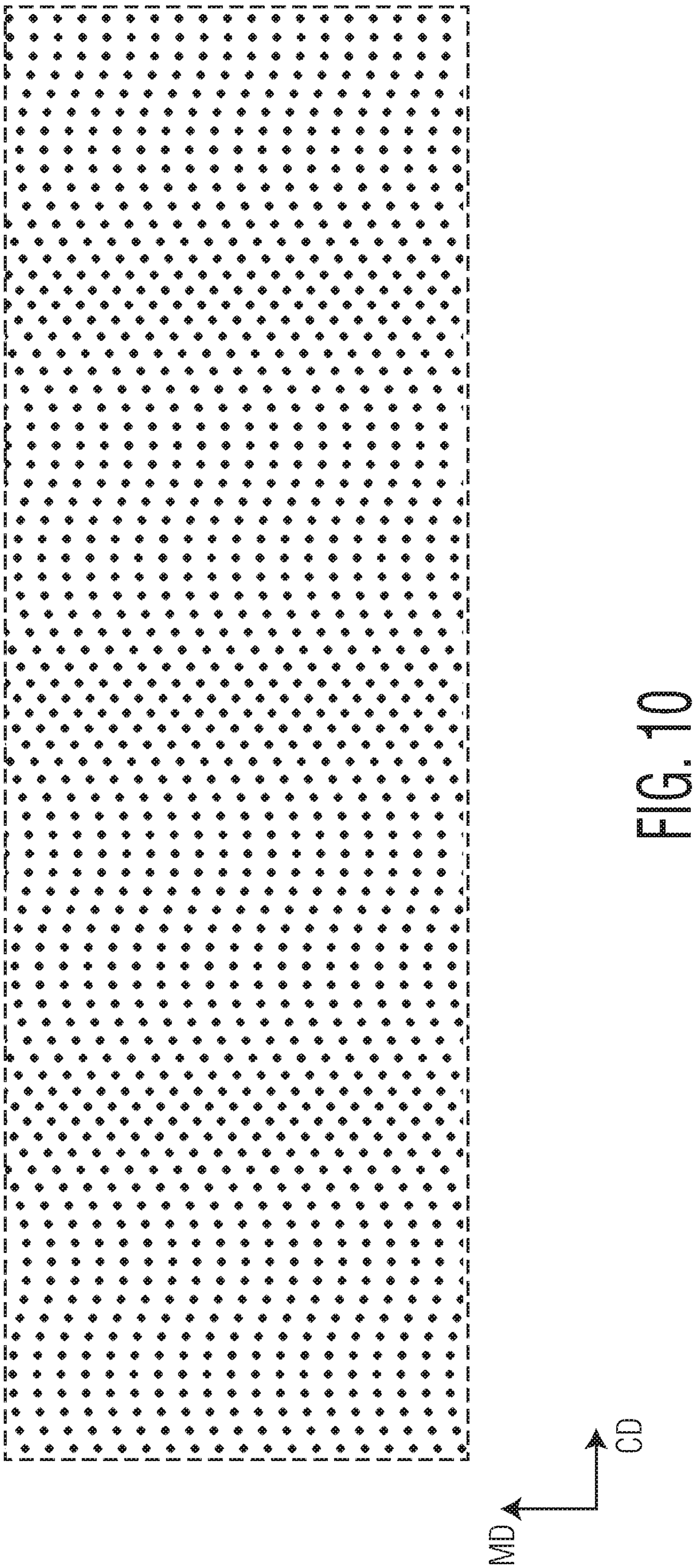
Figure 11:
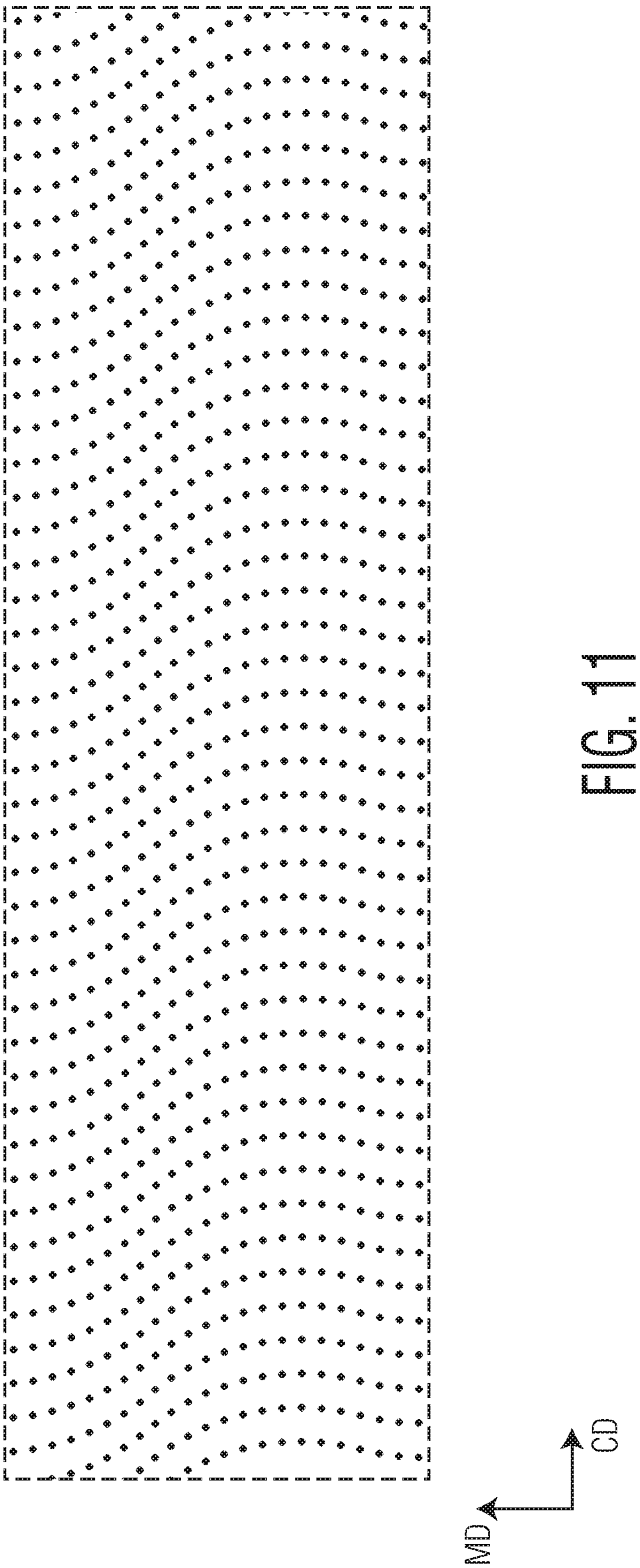
Figure 12:
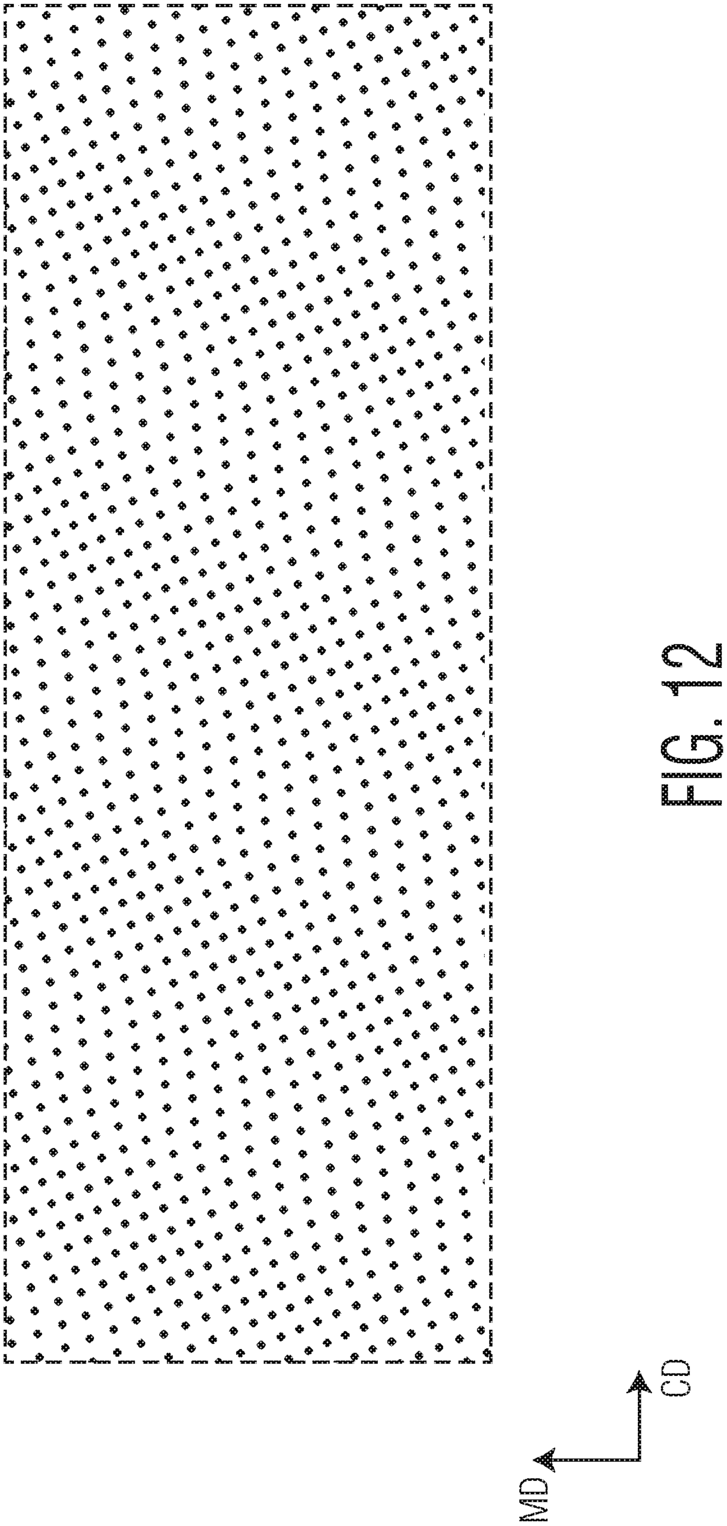

| Sample | Embossing Pattern FIG. | Element Density (#/cm$^2$) | Surface Area (%) | Element Pattern | Pattern Axis of Orientation |
|---|---|---|---|---|---|
| 1 | — | — | — | — | — |
| 2 | FIG. 9 | 14.1 | 10.7 | — | — |
| 3 | FIG. 10 | 14.1 | 10.7 | Sinusoidal Wave | CD |
| 4 | FIG. 11 | 7.3 | 5.5 | Sinusoidal Wave | MD |
| 5 | FIG. 12 | 10.5 | 7.9 | Sinusoidal Wave | CD |

The two-ply tissue product was subjected to physical testing, the results of which are shown in Table 2, below.

TABLE 2

| Sample | Basis Weight (gsm) | Caliper (μm) | Sheet Bulk (cm$^3$/g) | Basesheet GMT (g/3") | Finished Product GMT (g/3") | Delta GMT (%) | CD TEA (gm · cm/cm$^2$) | GM Stretch (%) |
|---|---|---|---|---|---|---|---|---|
| 1 | 45.4 | 655 | 14.4 | 1374 | 1048 | 24% | 8.39 | 12.9 |
| 2 | 45.1 | 663 | 14.7 | 1348 | 955 | 29% | 7.62 | 11.2 |
| 3 | 45.1 | 701 | 15.5 | 1358 | 920 | 32% | 7.82 | 10.3 |
| 4 | 45.1 | 721 | 16.0 | 1341 | 911 | 32% | 7.20 | 10.6 |
| 5 | 44.6 | 693 | 15.5 | 1374 | 874 | 36% | 6.93 | 10.4 |

Figure 13:
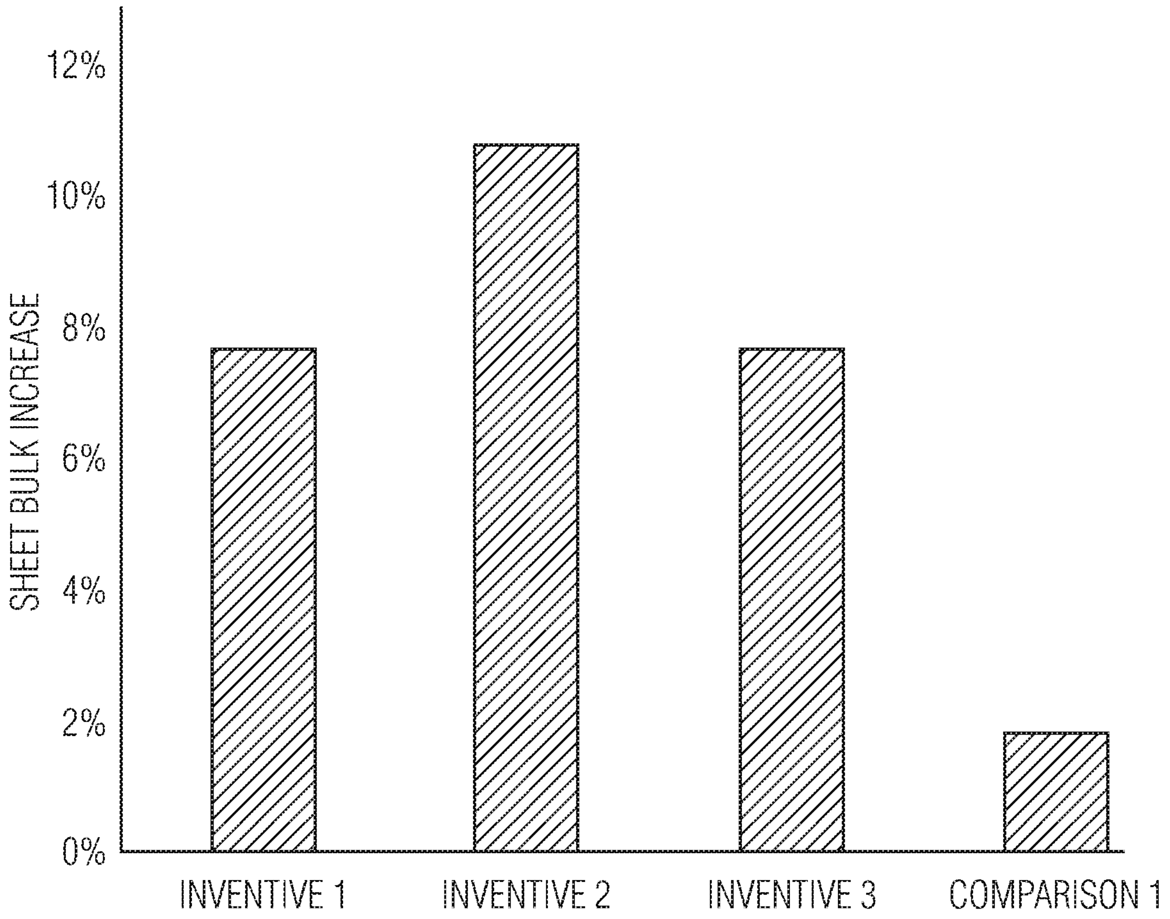
FIG. 13 is a graph comparing the sheet bulk of various inventive tissue products.

Embossing the second ply increased tensile degradation, particularly when the second ply was embossed with a pattern in the form of a sinusoidal wave. Embossing the second ply with a patterned embossment, particularly a wave-like embossing pattern, was also particularly effective in increasing the sheet bulk of the finished product. Generally, providing the second ply with a wave-like embossing pattern increased sheet bulk from about 8 to about 11 percent compared to a similar product comprising an unembossed second ply, as shown in Table 3, below. The increase in bulk was also observed compared to embossing the second ply with an overall background pattern. The increase in bulk is further illustrated in FIG. 13.

TABLE 3

| Sample | Basis Weight (gsm) | Caliper (μm) | Sheet Bulk (cc/g) | Delta Bulk (%) |
|---|---|---|---|---|
| 2 | 45.1 | 663 | 14.7 | 2% |
| 3 | 45.1 | 701 | 15.5 | 8% |
| 4 | 45.1 | 721 | 16.0 | 11% |
| 5 | 44.6 | 693 | 15.5 | 8% |

EMBODIMENTS

First Embodiment

An embossed multi-ply tissue product comprising: a first tissue ply having a molded topographical pattern and a first embossed pattern comprising a plurality of embossed elements disposed thereon; a second tissue ply having a molded topographical pattern and a second embossed pattern comprising a plurality of dot emboss elements disposed thereon, wherein the embossed, multi-ply tissue product has a basis weight from about 20 to about 60 grams per square meter (gsm) and a bulk greater than about 15 cubic centimeters per gram (cc/g).

Second Embodiment

The product of the first embodiment wherein both the molded topographical pattern and the first embossed pattern comprise a plurality of line elements.

Third Embodiment

The product of the first or second embodiments wherein both the first and second embossed patterns comprise a plurality of wave-like linear elements.

Fourth Embodiment

The product of any one of the first through third embodiments wherein the molded topographical pattern, the first embossed pattern and the second embossed pattern are different.

Fifth Embodiment

The product of any one of the first through fourth embodiments wherein the molded topographical pattern comprises a plurality of parallel, substantially machine direction (MD) oriented linear elements having an element angle from about 1 to about 20 degrees.

Sixth Embodiment

The product of any one of the first through fifth embodiments wherein the molded topographical pattern comprises a plurality of parallel and substantially MD oriented sinusoidal waves.

Seventh Embodiment

The product of any one of the first through sixth embodiments wherein the molded topographical pattern comprises a plurality of parallel substantially MD oriented, continuous, wave-like ridges spaced apart from one another by valleys.

Eighth Embodiment

The product of any one of the first through seventh embodiments wherein at least a first portion of the dot emboss elements overlay at least a portion of the wave-like ridges and at least a second portion of the dot emboss elements overlay at least a portion of the wave-like valleys.

Ninth Embodiment

The product of any one of the first through eighth embodiments wherein the first embossing pattern is continuous and the plurality of line emboss elements are curvilinear and either open or closed.

Tenth Embodiment

The product of any one of the first through ninth embodiments wherein the first embossing pattern is substantially free from dot emboss elements and covers from about 10 to about 30 percent of the first ply surface area.

Eleventh Embodiment

The product of any one of the first through tenth embodiments wherein the dot emboss elements have a shape selected from the group consisting of circles, squares, rectangles, diamonds, and combinations thereof, and the dot emboss elements are arranged to form wave-like linear elements.

Twelfth Embodiment

The product of any one of the first through eleventh embodiments wherein the first and the second tissue plies are through-air dried tissue webs and the molded topographical pattern is imparted by molding of the web to a through-air drying fabric.

Thirteenth Embodiment

The product of any one of the first through twelfth embodiments wherein the first and second tissue plies are adhesively bonded to one another at a plurality of bonded regions.

Fourteenth Embodiment

The product of any one of the first through thirteenth embodiments wherein at least a portion of the bonded regions are formed between the embossed area of the first ply and the embossed area of the second ply.

What is claimed is:

1. An embossed multi-ply tissue product comprising:

a. a first tissue ply having a molded topographical pattern and a first embossed pattern consisting essentially of a plurality of line embossed elements disposed thereon;

b. a second tissue ply having a molded topographical pattern and a second embossed pattern consisting essentially of a plurality of dot emboss elements disposed thereon, wherein the density of dot emboss elements in the second embossed pattern ranges from about 7.5 to about 20 dot embossments per square centimeter and the pattern is substantially free from line emboss elements and covers from about 5 to about 10 percent of the second ply surface area and the embossed, multi-ply tissue product has a basis weight from about 20 to about 60 grams per square meter (gsm) and a bulk greater than about 15 cubic centimeters per gram (cc/g).

2. The embossed multi-ply tissue product of claim 1 wherein both the molded topographical pattern and the first embossed pattern comprise a plurality of line elements.

3. The embossed multi-ply tissue product of claim 1 wherein both the first and second embossed pattern comprise a plurality of wave-like linear elements.

4. The embossed multi-ply tissue product of claim 1 wherein the molded topographical pattern, the first embossed pattern and the second embossed pattern are different.

5. The embossed multi-ply tissue product of claim 1 wherein the dot emboss elements have a shape selected from the group consisting of circles, squares, rectangles, diamonds, and combinations thereof, and the dot emboss elements are arranged to form wave-like linear elements.

6. The embossed multi-ply tissue product of claim 1 wherein the molded topographical pattern comprises a plurality of parallel, substantially machine direction (MD) oriented linear elements having an element angle from about 1 to about 20 degrees.

7. The embossed multi-ply tissue product of claim 1 wherein the molded topographical pattern comprises a plurality of parallel and substantially MD oriented sinusoidal waves.

8. The embossed multi-ply tissue product of claim 1 wherein the molded topographical pattern comprises a plurality of parallel substantially MD oriented, continuous, wave-like ridges spaced apart from one another by valleys.

9. The embossed multi-ply tissue product of claim 8 wherein at least a first portion of the dot emboss elements overlay at least a portion of the wave-like ridges and at least a second portion of the dot emboss elements overlay at least a portion of the wave-like valleys.

10. The embossed multi-ply tissue product of claim 1 wherein the first embossing pattern is continuous and the plurality of line emboss elements are curvilinear and either open or closed.

11. The embossed multi-ply tissue product of claim 1 wherein first embossing pattern is substantially free from dot emboss elements and covers from about 10 to about 30 percent of the first ply surface area.

12. The embossed multi-ply tissue product of claim 1 wherein the first and the second tissue plies are through-air dried tissue webs and the molded topographical pattern is imparted by molding of the web to a through-air drying fabric.

13. The embossed multi-ply tissue product of claim 1 wherein the first and second tissue plies are adhesively bonded to one another at a plurality of bonded regions.

14. The embossed multi-ply tissue product of claim 13 wherein at least a portion of the bonded regions are formed between the line emboss elements of the first ply and the dot emboss elements of the second ply.

15. The embossed multi-ply tissue product of claim 14 wherein the embossed multi-ply tissue product has a geometric mean tensile strength (GMT) from about 800 to about 1,200 g/3".

16. The embossed multi-ply tissue product of claim 15 wherein the embossed multi-ply tissue product has an Average TS7 value from about 10.0 to about 12.0.

* * * * *